United States Patent
Salsbury et al.

(10) Patent No.: US 10,209,684 B2
(45) Date of Patent: Feb. 19, 2019

(54) SELF-CONFIGURING EXTREMUM-SEEKING CONTROL SYSTEM

(71) Applicant: Johnson Controls Technology Company, Holland, MI (US)

(72) Inventors: Timothy I. Salsbury, Whitefish Bay, WI (US); John M. House, Montreal (CA)

(73) Assignee: Johnson Controls Technology Company, Auburn Hills, MI (US)

( * ) Notice: Subject to any disclaimer, the term of this patent is extended or adjusted under 35 U.S.C. 154(b) by 322 days.

(21) Appl. No.: 14/975,527

(22) Filed: Dec. 18, 2015

(65) Prior Publication Data

US 2017/0176954 A1 Jun. 22, 2017

(51) Int. Cl.
*G05B 13/02* (2006.01)
*G05B 13/00* (2006.01)
*G05B 21/00* (2006.01)
*F24F 5/00* (2006.01)
G05B 13/04 (2006.01)
F24F 140/60 (2018.01)
F24F 11/46 (2018.01)

(52) U.S. Cl.
CPC ......... *G05B 13/022* (2013.01); *G05B 13/024* (2013.01); *F24F 11/46* (2018.01); *F24F 2140/60* (2018.01); *G05B 13/042* (2013.01); *G05B 2219/2614* (2013.01); *G05B 2219/2642* (2013.01)

(58) Field of Classification Search
CPC .................................................. G05B 13/022
USPC .......................................................... 700/33
See application file for complete search history.

(56) References Cited

U.S. PATENT DOCUMENTS

| 7,827,813 | B2 | 11/2010 | Seem |
| 8,027,742 | B2 | 9/2011 | Seem et al. |
| 8,200,344 | B2 | 6/2012 | Li et al. |
| 8,200,345 | B2 | 6/2012 | Li et al. |
| 8,473,080 | B2 | 6/2013 | Seem et al. |
| 8,542,708 | B1 * | 9/2013 | Mok ...................... H04J 3/0685 370/503 |
| 9,019,997 | B1 * | 4/2015 | Mok ...................... H04B 10/07 370/503 |

OTHER PUBLICATIONS

U.S. Appl. No. 14/495,773, filed Sep. 24, 2014, Johnson Controls Technology Company.

(Continued)

*Primary Examiner* — Ly D Pham
(74) *Attorney, Agent, or Firm* — Foley & Lardner LLP

(57) ABSTRACT

A self-configuring extremum-seeking controller includes a dither signal generator, a communications interface, a phase delay estimator, and a bandwidth estimator. The dither signal generator identifies a stored dither frequency, generates a dither signal having the stored dither frequency, and uses the dither signal to perturb a control input for a plant. The communications interface provides the perturbed control input to the plant and receives an output signal from the plant resulting from the perturbed control input. The phase delay estimator estimates a phase delay between the output signal and the dither signal. The bandwidth estimator estimates a bandwidth of the plant based on the estimated phase delay. The dither signal generator updates the stored dither frequency based on the estimated bandwidth.

18 Claims, 7 Drawing Sheets

(56) References Cited

OTHER PUBLICATIONS

U.S. Appl. No. 14/538,700, filed Nov. 11, 2014, Johnson Controls Technology Company.
Krstic et al., "Stability of extremum seeking feedback for general nonlinear dynamic systems," Automatica, vol. 36 No. 4, Apr. 2000, 7 pages.
Savitzky et al., "Smoothing and Differentiation of Data by Simplified Least Squares Procedures," Analytical Chemistry, vol. 36, No. 8, Jul. 1964, 13 pages.

* cited by examiner

SELF-CONFIGURING EXTREMUM-SEEKING CONTROL SYSTEM

BACKGROUND

The present disclosure relates generally to extremum-seeking control strategies. The present disclosure relates more particularly to regulating, via extremum-seeking control, a variable of interest (e.g., power production, power consumption, rate of refrigerant flow, etc.) in an energy system.

Extremum-seeking control (ESC) is a class of self-optimizing control strategies that can dynamically search for the unknown and/or time-varying inputs of a system for optimizing a certain performance index. It can be considered a dynamic realization of gradient searching through the use of dither signals. The gradient of the system output with respect to the system input is typically obtained by slightly perturbing the system operation and applying a demodulation measure. Optimization of system performance can be obtained by driving the gradient towards zero by using an integrator in the closed-loop system. ESC is a non-model based control strategy, meaning that a model for the controlled system is not necessary for ESC to optimize the system. ESC has been used in many different engineering applications (e.g., combustion, circuitry, mining, aerospace and land-based vehicles, building HVAC, wind and solar energy, etc.) and has been shown to be able to improve the operational efficiency and performance for these engineering applications.

Although ESC does not require a model of the system to optimize the system output, properly configuring an ESC system may require knowledge of the system bandwidth (e.g., the natural frequency $\omega_n$ of the plant) to select the frequency $\omega_d$ of the dither signal. For example, it may be desirable to select a dither signal frequency $\omega_d$ that is the same or similar to the natural frequency $\omega_n$ of the plant to enhance the effect of the dither signal d on the performance variable y (e.g., by increasing the resonance between the dither signal d and the plant). Additionally, it may be desirable to know the system gain $K_s$ in order to properly set the rate of gradient descent.

Traditional ESC systems require manual configuration and testing to determine suitable values for system parameters such as the system bandwidth and system gain. For example, a manual step test system identification procedure can be performed to estimate the system bandwidth. However, such testing requires disturbing the system (causing operation disruption) and assumes that the bandwidth does not change after testing. It would be desirable to provide an automatic configuration procedure that is non-disruptive and can automatically determine system parameters without requiring manual testing and configuration.

SUMMARY

One implementation of the present disclosure is a self-configuring extremum-seeking controller. The controller includes a dither signal generator, a communications interface, a phase delay estimator, and a bandwidth estimator. The dither signal generator identifies a stored dither frequency, generates a dither signal having the stored dither frequency, and uses the dither signal to perturb a control input for a plant. The communications interface provides the perturbed control input to the plant and receives an output signal from the plant resulting from the perturbed control input. The phase delay estimator estimates a phase delay between the output signal and the dither signal. The bandwidth estimator estimates a bandwidth of the plant based on the estimated phase delay. The dither signal generator updates the stored dither frequency based on the estimated bandwidth.

In some embodiments, the dither signal generator generates a new dither signal having the updated dither frequency and uses the new dither signal to perturb the control input for the plant.

In some embodiments, the bandwidth estimator estimates a natural frequency of the plant based on the estimated phase delay and uses the estimated natural frequency of the plant as the estimated bandwidth. In some embodiments, the bandwidth estimator estimates the bandwidth of the plant as a function of the estimated phase delay and the stored dither frequency.

In some embodiments, the phase delay estimator calculates a dot product of the dither signal and the output signal, calculates 2-norms of the dither signal and the output signal, and estimates the phase delay as a function of the dot product and the 2-norms.

In some embodiments, the controller includes an exponentially-weighted moving average (EWMA) calculator that calculates a first EWMA of the dither signal and a second EWMA of the output signal from the plant. In some embodiments, the phase delay estimator estimates the phase delay as a function of the first and second EWMAs. In some embodiments, the gain estimator estimates the system gain as a function of the first and second EWMAs.

In some embodiments, the controller includes a gain estimator that estimates a system gain based on the estimated bandwidth and the stored dither frequency. The controller may include an integrator that uses the estimated system gain to scale a step size of a gradient descent procedure performed by the controller.

Another implementation of the present disclosure is a method for self-configuring one or more extremum-seeking control parameters used by an extremum-seeking controller to modulate a control input for a plant. The method includes receiving a stored dither frequency at the extremum-seeking controller, generating a dither signal having the stored dither frequency, and using the dither signal to perturb the control input for the plant. The method includes providing the perturbed control input from the controller to the plant and receiving an output signal from the plant resulting from the perturbed control input. The method includes estimating a phase delay between the output signal and the dither signal and estimating a bandwidth of the plant based on the estimated phase delay. The method includes updating the stored dither frequency based on the estimated bandwidth. The generating, providing, estimating, and updating steps may be performed automatically by the controller.

In some embodiments, the method includes generating a new dither signal having the updated dither frequency and using the new dither signal to perturb the control input for the plant.

In some embodiments, estimating the bandwidth of the plant includes estimating a natural frequency of the plant based on the estimated phase delay and using the estimated natural frequency of the plant as the estimated bandwidth. In some embodiments, the bandwidth of the plant is estimated as a function of the estimated phase delay and the stored dither frequency.

In some embodiments, estimating the phase delay between the output signal and the dither signal includes calculating a dot product of the dither signal and the output signal, calculating 2-norms of the dither signal and the output signal, and estimating the phase delay as a function of the dot product and the 2-norms.

In some embodiments, the method includes calculating a first exponentially-weighted moving average (EWMA) of the dither signal and a second EWMA of the output signal from the plant. In some embodiments, the phase delay is estimated as a function of the first and second EWMAs. In some embodiments, the system gain is estimated as a function of the first and second EWMAs.

In some embodiments, the method includes estimating a system gain based on the estimated bandwidth and the stored dither frequency and using the estimated system gain to scale a step size of a gradient descent procedure performed by the controller.

Another implementation of the present disclosure is a self-configuring extremum-seeking controller. The controller includes a dither signal generator, a communications interface, and a parameter estimator. The dither signal generator generates a dither signal and uses the dither signal to perturb a control input for a plant. The communications interface provides the perturbed control input to the plant and receives an output signal from the plant resulting from the perturbed control input. The parameter estimator uses the output signal from the plant in conjunction with the dither signal to generate values for one or more extremum-seeking control parameters. The dither signal generator uses the generated values for the extremum-seeking control parameters to generate the dither signal.

In some embodiments, the parameter estimator includes a phase delay estimator that estimates a phase delay between the output signal and the dither signal and a bandwidth estimator that estimates a bandwidth of the plant based on the estimated phase delay. The dither signal generator may use the estimated bandwidth to update a stored dither frequency used to generate the dither signal.

In some embodiments, the parameter estimator includes a gain estimator that estimates a system gain based on the estimated bandwidth and the stored dither frequency. The controller may include an integrator that uses the estimated system gain to scale a step size of a gradient descent procedure performed by the controller.

In some embodiments, the controller includes an exponentially-weighted moving average (EWMA) calculator that calculates a first EWMA of the dither signal and a second EWMA of the output signal from the plant. At least one of the phase delay and the system gain may be estimated as a function of the first and second EWMAs.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1:
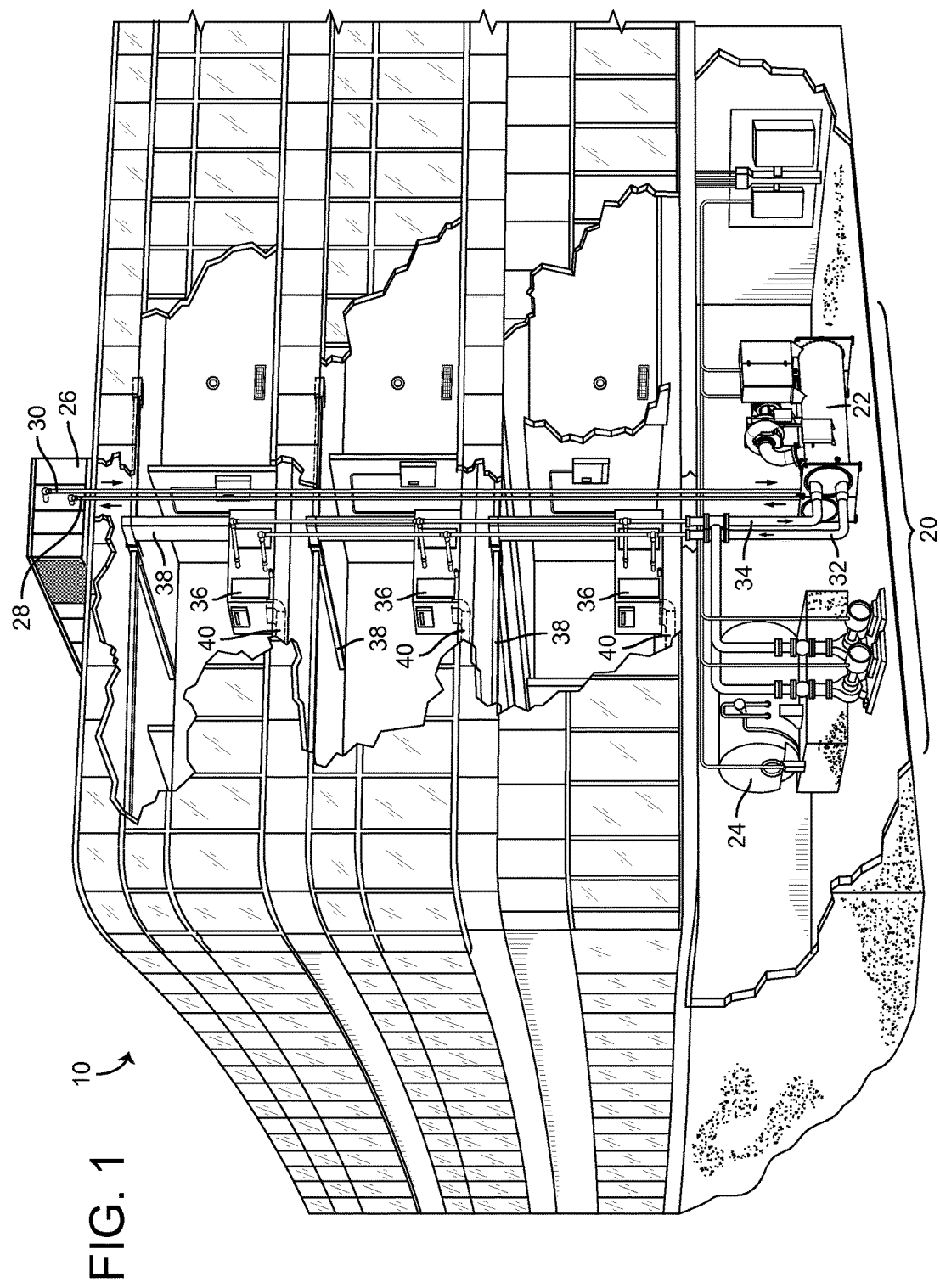
FIG. 1 is a drawing of a building equipped with a HVAC system in which the present invention may be implemented, according to an exemplary embodiment.

Referring generally to the FIGURES, a self-configuring extremum-seeking control (SCESC) system and components thereof are shown according to various exemplary embodiments. In general, extremum-seeking control (ESC) is a class of self-optimizing control strategies that can dynamically search for the unknown and/or time-varying inputs of a system for optimizing a certain performance index. It can be considered a dynamic realization of gradient searching through the use of dither signals. The gradient of the system output with respect to the system input is typically obtained by slightly perturbing the system operation and applying a demodulation measure. Optimization of system performance can be obtained by driving the gradient towards zero by using an integrator in the closed-loop system. ESC is a non-model based control strategy, meaning that a model for the controlled system is not necessary for ESC to optimize the system. Various implementations of ESC are described in detail in U.S. Pat. Nos. 8,473,080, 7,827,813, 8,027,742, 8,200,345, 8,200,344, U.S. patent application Ser. Nos. 14/495,773, and 14/538,700. The entire disclosure of each of these patents and patent applications is incorporated by reference herein.

The SCESC system described herein includes a self-configuring extremum-seeking controller (SCESC) and a plant. The controller receives feedback from the plant and provides a control input to the plant. The controller perturbs the control input u to the plant with a dither signal d and analyzes the effect of such perturbation on an observed performance variable y. The controller adjusts the control input u to drive the gradient of performance variable y to zero. In this way, the controller identifies values for control input u that achieve an optimal value (e.g., a maximum or a minimum) for performance variable y.

Although ESC does not require a model of the system to optimize performance variable y, properly configuring an ESC system may require knowledge of the system bandwidth (e.g., the natural frequency $\omega_n$ of the plant) to select the frequency $\omega_d$ of the dither signal d. For example, it may be desirable to select a dither signal frequency $\omega_d$ that is the same or similar to the natural frequency $\omega_n$ of the plant to enhance the effect of the dither signal d on the performance variable y (e.g., by increasing the resonance between the dither signal d and the plant). Additionally, it may be desirable to know the system gain $K_s$ in order to properly set the rate of gradient descent. Advantageously, the SCESC controller described herein may be configured to automatically determine both the system bandwidth and the system gain using the dither signal d to perform system identification.

In some embodiments, the SCESC controller determines the natural frequency $\omega_n$ of the plant and uses the natural frequency $\omega_n$ as the system bandwidth. The SCESC controller may determine the natural frequency $\omega_n$ based on the phase delay $\phi$ between the dither signal d and the performance variable y. For example, the SCESC controller may excite the plant with a dither signal d having a known dither frequency $\omega_d$ and may measure the resultant phase delay $\phi$ of the performance variable y relative to the dither signal d. The SCESC controller may use the phase delay $\phi$ in conjunction with the dither signal frequency $\omega_d$ to estimate the natural frequency $\omega_n$, as shown in the following equation:

$$\omega_n = -\omega_d \left( \cot(\phi) - \sqrt{\frac{1}{\sin^2(\phi)}} \right)$$

The SCESC controller may use the natural frequency $\omega_n$ to set or update the dither signal frequency $\omega_d$ (e.g., by setting the dither signal frequency $\omega_d$ equal to the natural frequency $\omega_n$).

In some embodiments, the SCESC controller uses a history of values for the dither signal d to calculate an exponentially-weighted moving average (EWMA) $s_{d,k}$ of the dither signal d at time k. Similarly, the SCESC controller may use a history of values for the performance variable y to calculate an EWMA $s_{y,k}$ of the performance variable y at time k. The SCESC controller may use the EWMAs $s_{d,k}$ and $s_{y,k}$ in conjunction with the natural frequency $\omega_n$ and the known dither signal frequency $\omega_d$ to estimate the system gain $K_s$, as shown in the following equation:

$$K_s = \sqrt{\frac{s_{y,k}}{s_{d,k}} \left( \left(1 - \left(\frac{\omega_d}{\omega_n}\right)^2\right)^2 + \left(2\zeta \frac{\omega_d}{\omega_n}\right)^2 \right)}$$

The SCESC controller may use the system gain $K_s$ to set or update the rate of gradient descent.

Advantageously, automatically determining the system bandwidth and the system gain enables the SCESC system to be configured automatically (e.g., without manual testing and configuration) and updated periodically as the ESC parameters and/or system conditions change. Additional features and advantages of the present invention are described in greater detail below.

Building and HVAC System

Figure 2:
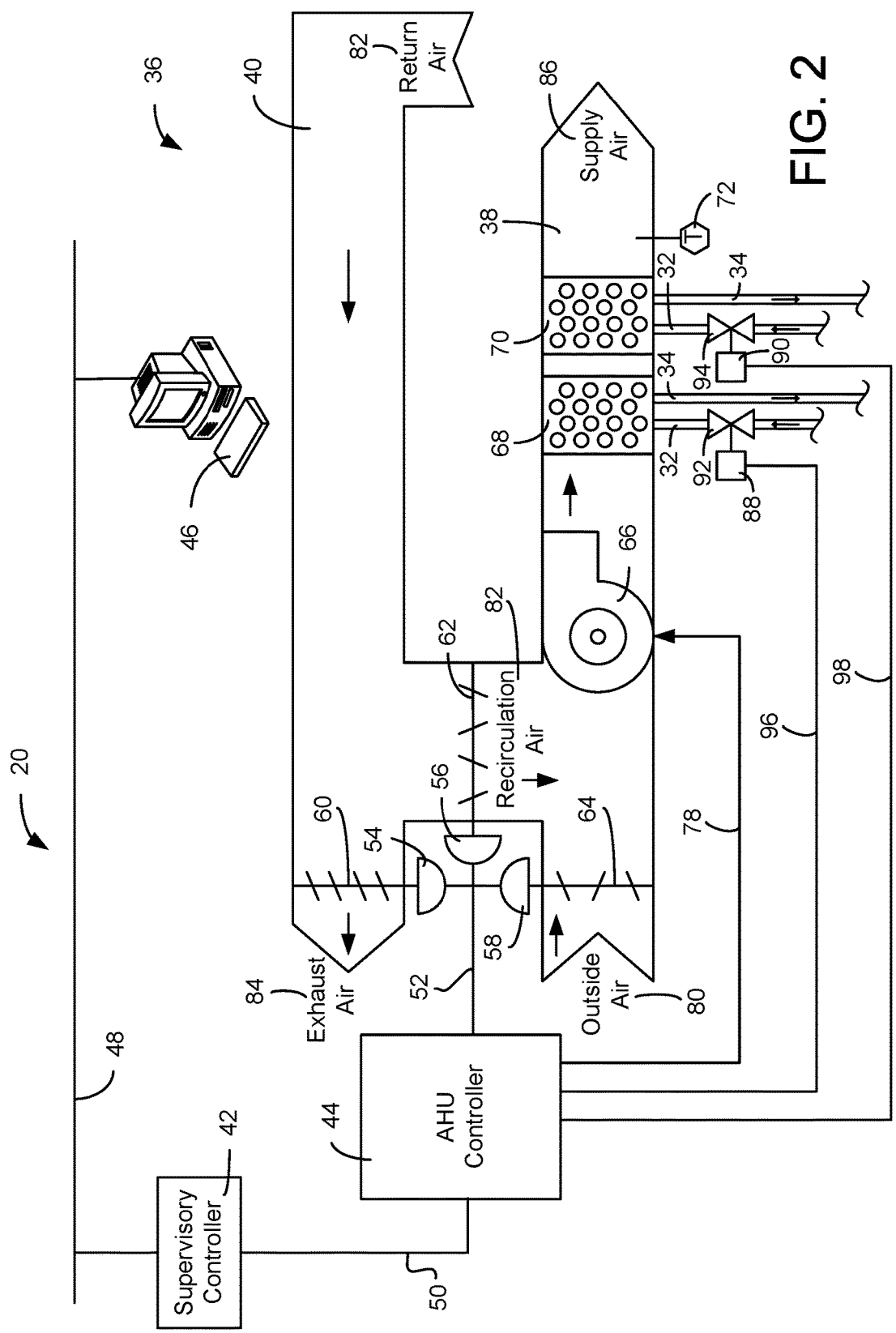
FIG. 2 is a block diagram illustrating the HVAC system of FIG. 1 in greater detail, according to an exemplary embodiment.

Referring now to FIGS. 1-2, an exemplary building 10 and HVAC system 20 in which an extremum-seeking control system may be implemented are shown, according to an exemplary embodiment. Although the ESC systems and methods of the present disclosure are described primarily in the context of a building HVAC system, it should be understood that ESC may be generally applicable to any type of control system that optimizes or regulates a variable of interest. For example, the ESC systems and methods of the present disclosure may be used to optimize an amount of energy produced by various types of energy producing systems or devices (e.g., power plants, steam or wind turbines, solar panels, combustion systems, etc.) and/or to optimize an amount of energy consumed by various types of energy consuming systems or devices (e.g., electronic circuitry, mechanical equipment, aerospace and land-based vehicles, building equipment, HVAC devices, refrigeration systems, etc.).

In various implementations, ESC may be used in any type of controller that functions to achieve a setpoint for a variable of interest (e.g., by minimizing a difference between a measured or calculated input and a setpoint) and/or optimize a variable of interest (e.g., maximize or minimize an output variable). It is contemplated that ESC can be readily implemented in various types of controllers (e.g., motor controllers, power controllers, fluid controllers, HVAC controllers, lighting controllers, chemical controllers, process controllers, etc.) and various types of control systems (e.g., closed-loop control systems, open-loop control systems, feedback control systems, feed-forward control systems, etc.) as may be suitable for various applications. All such implementations should be considered within the scope of the present disclosure.

Referring particularly to FIG. 1, a perspective view of building 10 is shown. Building 10 is served by HVAC system 20. HVAC system 20 is shown to include a chiller 22, a boiler 24, a rooftop cooling unit 26, and a plurality of air-handling units (AHUs) 36. HVAC system 20 uses a fluid circulation system to provide heating and/or cooling for building 10. The circulated fluid may be cooled in chiller 22 or heated in boiler 24, depending on whether cooling or heating is required. Boiler 24 may add heat to the circulated fluid by burning a combustible material (e.g., natural gas). Chiller 22 may place the circulated fluid in a heat exchange relationship with another fluid (e.g., a refrigerant) in a heat exchanger (e.g., an evaporator). The refrigerant removes heat from the circulated fluid during an evaporation process, thereby cooling the circulated fluid.

The circulated fluid from chiller 22 or boiler 24 may be transported to AHUs 36 via piping 32. AHUs 36 may place the circulated fluid in a heat exchange relationship with an airflow passing through AHUs 36. For example, the airflow may be passed over piping in fan coil units or other air conditioning terminal units through which the circulated fluid flows. AHUs 36 may transfer heat between the airflow and the circulated fluid to provide heating or cooling for the airflow. The heated or cooled air may be delivered to building 10 via an air distribution system including air supply ducts 38 and may return to AHUs 36 via air return ducts 40. In FIG. 1, HVAC system 20 is shown to include a separate AHU 36 on each floor of building 10. In other embodiments, a single AHU (e.g., a rooftop AHU) may supply air for multiple floors or zones. The circulated fluid from AHUs 36 may return to chiller 22 or boiler 24 via piping 34.

In some embodiments, the refrigerant in chiller 22 is vaporized upon absorbing heat from the circulated fluid. The vapor refrigerant may be provided to a compressor within chiller 22 where the temperature and pressure of the refrigerant are increased (e.g., using a rotating impeller, a screw compressor, a scroll compressor, a reciprocating compressor, a centrifugal compressor, etc.). The compressed refrigerant may be discharged into a condenser within chiller 22.

In some embodiments, water (or another chilled fluid) flows through tubes in the condenser of chiller 22 to absorb heat from the refrigerant vapor, thereby causing the refrigerant to condense. The water flowing through tubes in the condenser may be pumped from chiller 22 to a rooftop cooling unit 26 via piping 28. Cooling unit 26 may use fan driven cooling or fan driven evaporation to remove heat from the water. The cooled water in rooftop unit 26 may be delivered back to chiller 22 via piping 30 and the cycle repeats.

Referring now to FIG. 2, a block diagram illustrating a portion of HVAC system 20 in greater detail is shown, according to an exemplary embodiment. In FIG. 2, AHU 36 is shown as an economizer type air handling unit. Economizer type air handling units vary the amount of outside air and return air used by the air handling unit for heating or cooling. For example, AHU 36 may receive return air 82 from building 10 via return air duct 40 and may deliver supply air 86 to building 10 via supply air duct 38. AHU 36 may be configured to operate exhaust air damper 60, mixing damper 62, and outside air damper 64 to control an amount of outside air 80 and return air 82 that combine to form supply air 86. Any return air 82 that does not pass through mixing damper 62 may be exhausted from AHU 36 through exhaust damper 60 as exhaust air 84.

Each of dampers 60-64 may be operated by an actuator. As shown in FIG. 2, exhaust air damper 60 is operated by actuator 54, mixing damper 62 is operated by actuator 56, and outside air damper 64 is operated by actuator 58. Actuators 54-58 may communicate with an AHU controller 44 via a communications link 52. AHU controller 44 may be an economizer controller configured to use one or more control algorithms (e.g., state-based algorithms, ESC algorithms, PID control algorithms, model predictive control algorithms, etc.) to control actuators 54-58. Exemplary ESC methods that may be used by AHU controller 44 are described in greater detail with reference to FIGS. 6-7.

Actuators 54-58 may receive control signals from AHU controller 44 and may provide feedback signals to AHU controller 44. Feedback signals may include, for example, an indication of a current actuator or damper position, an amount of torque or force exerted by the actuator, diagnostic information (e.g., results of diagnostic tests performed by actuators 54-58), status information, commissioning information, configuration settings, calibration data, and/or other types of information or data that may be collected, stored, or used by actuators 54-58.

Still referring to FIG. 2, AHU 36 is shown to include a cooling coil 68, a heating coil 70, and a fan 66. In some embodiments, cooling coil 68, heating coil 70, and fan 66 are positioned within supply air duct 38. Fan 66 may be configured to force supply air 86 through cooling coil 68 and/or heating coil 70. AHU controller 44 may communicate with fan 66 via communications link 78 to control a flow rate of supply air 86. Cooling coil 68 may receive a chilled fluid from chiller 22 via piping 32 and may return the chilled fluid to chiller 22 via piping 34. Valve 92 may be positioned along piping 32 or piping 34 to control an amount of the chilled fluid provided to cooling coil 68. Heating coil 70 may receive a heated fluid from boiler 24 via piping 32 and may return the heated fluid to boiler 24 via piping 34. Valve 94 may be positioned along piping 32 or piping 34 to control an amount of the heated fluid provided to heating coil 70.

Each of valves 92-94 may be controlled by an actuator. As shown in FIG. 2, valve 92 is controlled by actuator 88 and valve 94 is controlled by actuator 90. Actuators 88-90 may communicate with AHU controller 44 via communications links 96-98. Actuators 88-90 may receive control signals from AHU controller 44 and may provide feedback signals to controller 44. In some embodiments, AHU controller 44 receives a measurement of the supply air temperature from a temperature sensor 72 positioned in supply air duct 38 (e.g., downstream of cooling coil 68 and heating coil 70). However, temperature sensor 72 is not required and may not be included in some embodiments.

AHU controller 44 may operate valves 92-94 via actuators 88-90 to modulate an amount of heating or cooling provided to supply air 86 (e.g., to achieve a setpoint temperature for supply air 86 or to maintain the temperature of supply air 86 within a setpoint temperature range). The positions of valves 92-94 affect the amount of cooling or heating provided to supply air 86 by cooling coil 68 or heating coil 70 and may correlate with the amount of energy consumed to achieve a desired supply air temperature. In various embodiments, valves 92-94 may be operated by AHU controller 44 or a separate controller for HVAC system 20.

AHU controller 44 may monitor the positions of valves 92-94 via communications links 96-98. AHU controller 44 may use the positions of valves 92-94 as the variable to be optimized using an ESC control technique. AHU controller 44 may determine and/or set the positions of dampers 60-64 to achieve an optimal or target position for valves 92-94. The optimal or target position for valves 92-94 may be the position that corresponds to the minimum amount of mechanical heating or cooling used by HVAC system 20 to achieve a setpoint supply air temperature (e.g., minimum fluid flow through valves 92-94).

Still referring to FIG. 2, HVAC system 20 is shown to include a supervisory controller 42 and a client device 46. Supervisory controller 42 may include one or more computer systems (e.g., servers, BAS controllers, etc.) that serve as enterprise level controllers, application or data servers, head nodes, master controllers, or field controllers for HVAC system 20. Supervisory controller 42 may communicate with multiple downstream building systems or subsystems (e.g., an HVAC system, a security system, etc.) via a communications link 50 according to like or disparate protocols (e.g., LON, BACnet, etc.).

In some embodiments, AHU controller 44 receives information (e.g., commands, setpoints, operating boundaries, etc.) from supervisory controller 42. For example, supervisory controller 42 may provide AHU controller 44 with a high fan speed limit and a low fan speed limit. A low limit may avoid frequent component and power taxing fan start-ups while a high limit may avoid operation near the mechanical or thermal limits of the fan system. In various embodiments, AHU controller 44 and supervisory controller 42 may be separate (as shown in FIG. 2) or integrated. In an integrated implementation, AHU controller 44 may be a software module configured for execution by a processor of supervisory controller 42.

Client device 46 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 20, its subsystems, and/or devices. Client device 46 may be a computer workstation, a client terminal, a remote or local interface, or any other type of user interface device. Client device 46 may be a stationary terminal or a mobile device. For example, client device 46 may be a desktop computer, a computer server with a user interface, a laptop computer, a tablet, a smartphone, a PDA, or any other type of mobile or non-mobile device.

Extremum-Seeking Control Systems

Figure 3A:
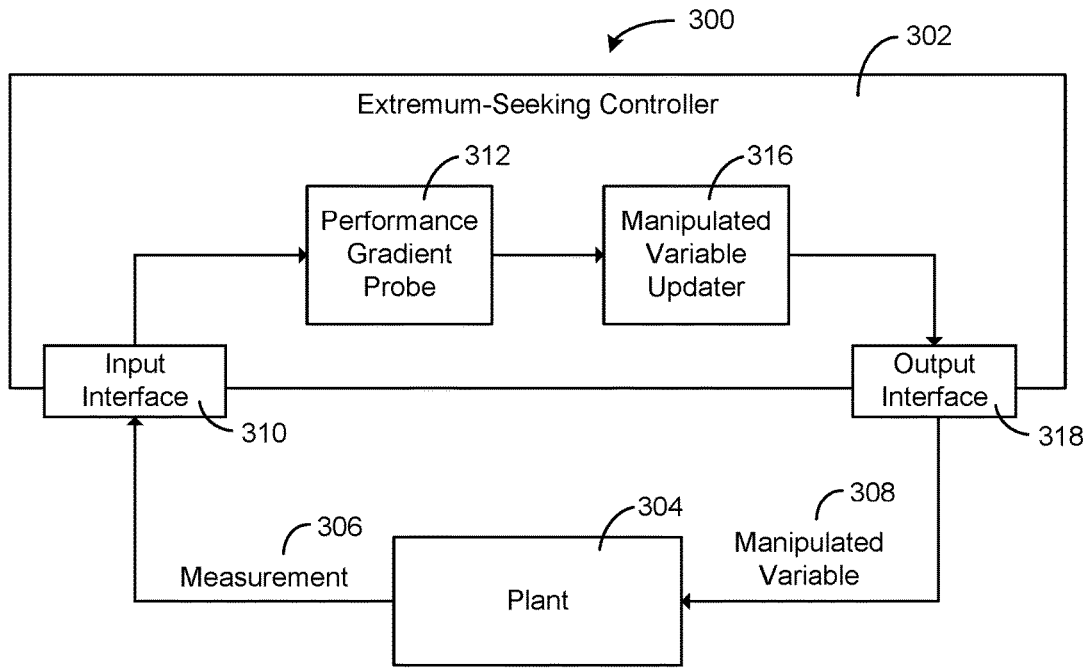
FIG. 3A is a block diagram of an example single-input single-output (SISO) extremum-seeking control (ESC) system in which the present invention may be implemented, according to an exemplary embodiment.

Referring now to FIG. 3A, a block diagram of an extremum-seeking control (ESC) system 300 is shown, according to an exemplary embodiment. ESC system 300 is shown to include an extremum-seeking controller 302 and a plant 304. A plant in control theory is the combination of a process and one or more mechanically-controlled outputs. For example, plant 304 may be an air handling unit configured to control temperature within a building space via one or more mechanically-controlled actuators and/or dampers. In various embodiments, plant 304 may include a chiller operation process, a damper adjustment process, a mechanical cooling process, a ventilation process, a refrigeration process, or any other process where a variable is manipulated to affect an output from plant 304.

Extremum-seeking controller 302 uses extremum-seeking control logic to modulate its output in response to a changing measurement 306 received from plant 304 via input interface 310. Measurements from plant 304 may include, but are not limited to, information received from sensors about the state of plant 304 or control signals sent to other devices in the system. In some embodiments, measurement 306 is a measured or observed position of one of valves 92-94. In other embodiments, measurement 306 is a measured or calculated amount of power consumption, a fan speed, a damper position, a temperature, or any other variable that can be measured or calculated by plant 304. Measurement 306 may be the variable that extremum-seeking controller 302 seeks to optimize (i.e., the performance variable) via an extremum-seeking control process. Measurement 306 may be output by plant 304 or observed at plant 304 (e.g., via a sensor) and provided to extremum-seeking controller at input interface 310.

Input interface 310 provides measurement 306 to performance gradient probe 312 to detect the performance gradient. The performance gradient may indicate a slope of the function $y=f(x)$, where y represents measurement 306 and x represents manipulated variable 308. When the performance gradient is zero, measurement 306 has an extremum value (e.g., a maximum or minimum). Therefore, extremum-seeking controller 302 can optimize the value of measurement 306 by driving the performance gradient to zero. Manipulated variable updater 316 produces an updated manipulated variable 308 based upon the performance gradient. In an exemplary embodiment, manipulated variable updater 316 includes an integrator to drive the performance gradient to zero. Manipulated variable updater 316 then provides an updated manipulated variable 308 to plant 304 via output interface 318. In some embodiments, manipulated variable 308 is provided to one of dampers 60-64 (FIG. 2) or an actuator affecting dampers 60-64 as a control signal via output interface 318. Plant 304 may use manipulated variable 308 as a setpoint to adjust the position of dampers 60-64 and thereby control the relative proportions of outdoor air 80 and recirculation air 82 provided to a temperature-controlled space.

Figure 3B:
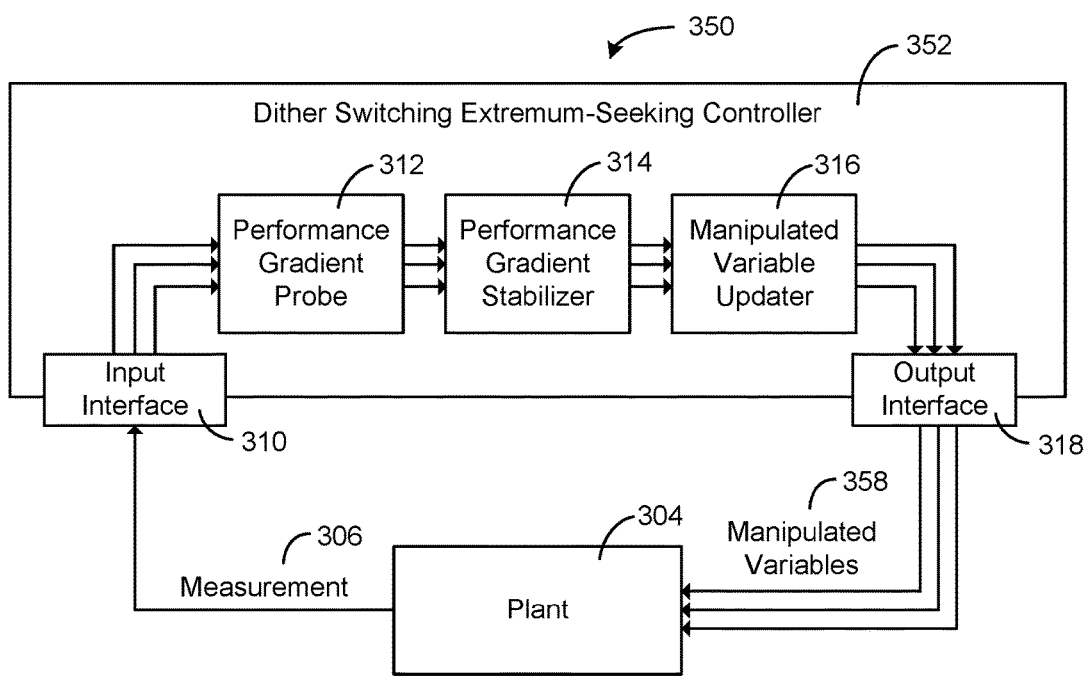
FIG. 3B is a block diagram of an example dither switching ESC system in which the present invention may be implemented, according to an exemplary embodiment.

Referring now to FIG. 3B, a block diagram of a dither switching extremum-seeking control (DSESC) system 350 is shown, according to an exemplary embodiment. DSESC system 350 is shown to include a dither switching extremum-seeking controller 352 and a plant 304. In DSESC system 350, measurement 306 is a function of several manipulated variables 358 provided as inputs to plant 304. Manipulated variables 358 may include any controlled input provided to plant 304 to affect the value of measurement 306. For example, manipulated variables 358 may include setpoints for multiple chillers, dampers, actuators, or other components of HVAC system 20 that can be operated to affect the value of measurement 306 (e.g., a measured supply air temperature, a measured power consumption, etc.). Controller 352 includes several of the same components as controller 302 (e.g., performance gradient probe 312, manipulated variable updater 316, input interface 310, and output interface 318) and an additional component shown as performance gradient stabilizer 314.

Controller 352 may be configured to perform a dither-demodulation process to determine the effect of manipulated variables 358 on measurement 306. For example, manipulated variable updater 316 may add dither signals to each of manipulated variables 358. In some embodiments, each of manipulated variables 358 is modified by a different dither signal having a different dither frequency. Performance gradient probe 312 may pass measurement 306 through multiple parallel high-pass filters (e.g., one for each dither signal) and apply a demodulation signal to the output of each high-pass filter. The frequency and phase of each demodulation signal may be selected to maximize the cross-correlation between the demodulation signal and the output of the corresponding high-pass filter. Performance gradient probe 312 may multiply the output of each high-pass filter by a different demodulation signal and provide each product to a low-pass filter. The cutoff frequencies of the high-pass and low-pass filters may be selected to extract gradient information from measurement 306. An exemplary dither-demodulation process which may be performed by controller 352 is described in greater detail with reference to FIG. 4.

In DSESC system 350, the outputs from performance gradient probe 312 are provided to a performance gradient stabilizer 314. Performance gradient stabilizer 314 may include, for example, hysteresis devices and/or flip/flop devices configured to stabilize the performance gradients while rejecting the negative impact of measurement noise. Performance gradient stabilizer 314 provides the stabilized performance gradients to manipulated variable updater 316, which uses integrators to drive the performance gradients to zero. In some embodiments, DSESC system 350 is the same or similar to the DSESC system described in U.S. patent application Ser. No. 14/538,700, filed Nov. 11, 2014, the entire disclosure of which is incorporated by reference herein.

Figure 4:
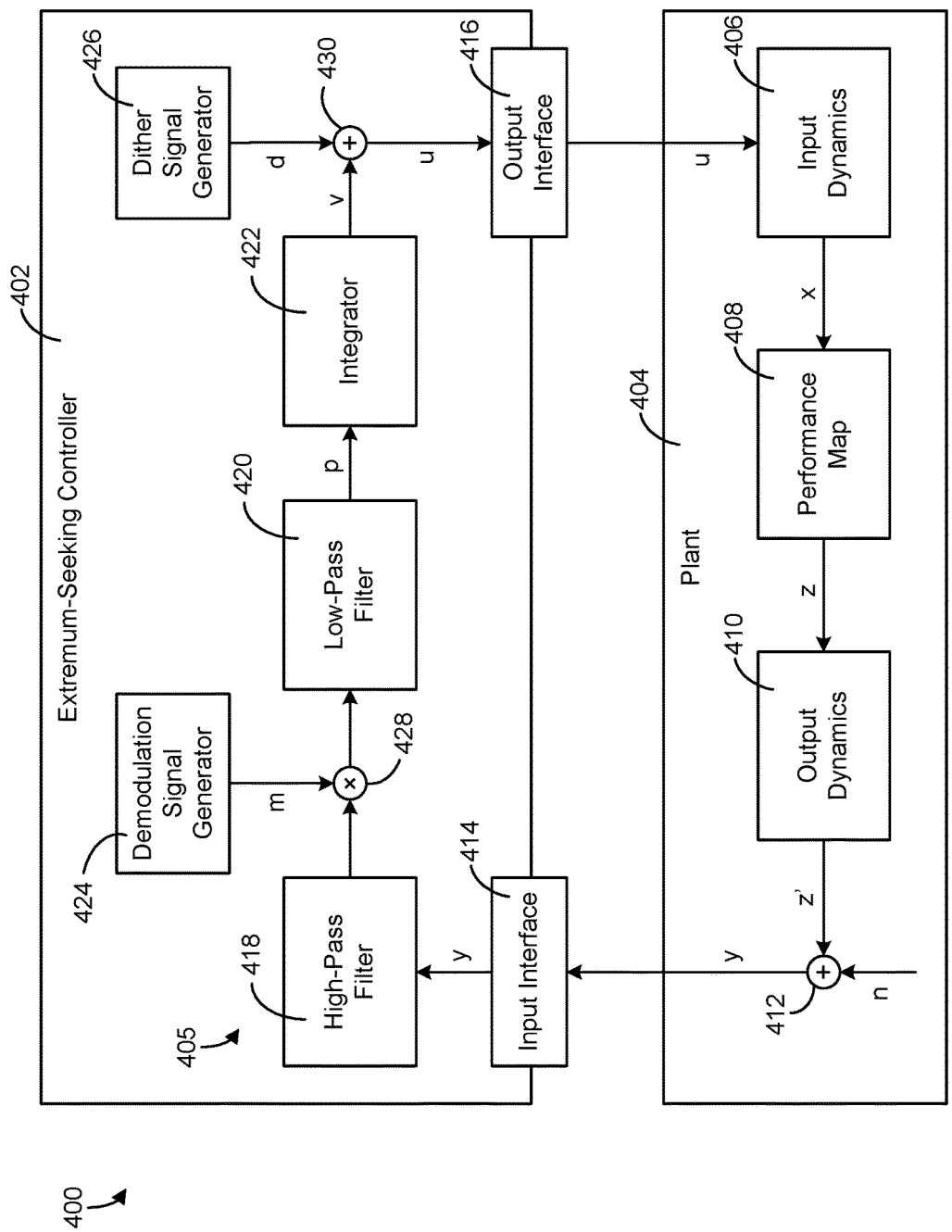
FIG. 4 is a block diagram of another example ESC system in which the present invention may be implemented, according to an exemplary embodiment.

Referring now to FIG. 4, a block diagram of another extremum-seeking control (ESC) system 400 is shown, according to an exemplary embodiment. ESC system 400 is shown to include a plant 404 and an extremum-seeking controller 402. Controller 402 uses an extremum-seeking control strategy to optimize a performance variable y received as an output from plant 404. Performance variable y may be the same or similar to measurement 306, as described with reference to FIGS. 3A-3B. For example, performance variable y may be the variable that ESC controller 402 seeks to optimize using an extremum-seeking control process. Optimizing performance variable y may include minimizing y, maximizing y, controlling y to achieve a setpoint, or otherwise regulating the value of performance variable y.

Plant 404 may be the same or similar to plant 304, as described with reference to FIGS. 3A-3B. For example, plant 404 may be a combination of a process and one or more mechanically-controlled outputs. In some embodiments, plant 404 is an air handling unit configured to control temperature within a building space via one or more mechanically-controlled actuators and/or dampers. In other embodiments, plant 404 may include a chiller operation process, a damper adjustment process, a mechanical cooling process, a ventilation process, or any other process that generates an output based on one or more control inputs.

Plant 404 may be represented mathematically as a combination of input dynamics 406, a performance map 408, output dynamics 410, and noise n. In some embodiments, input dynamics 406 are linear time-invariant (LTI) input dynamics and output dynamics 410 are LTI output dynamics. Performance map 408 may be a static nonlinear performance map. Noise n may be process noise, measurement noise, or a combination of both. The actual mathematical model for plant 404 does not need to be known in order to apply ESC and is illustrative only.

Plant 404 receives a control input u (e.g., a control signal, a manipulated variable, etc.) from output interface 416 of extremum-seeking controller 402. Input dynamics 406 may use the control input u to generate a function signal x based on the control input (e.g., x=f(u)). Function signal x may be passed to performance map 408 which generates an output signal z as a function of the function signal (i.e., z=f(x)). Extremum-seeking controller 402 may seek to find values for x and/or u that optimize the output z of performance map 408. The output signal z may be passed through output dynamics 410 to produce signal z', which is modified by noise n to produce performance variable y (e.g., y=z'+n). Performance variable y is provided as an output from plant 404 and received at input interface 414 of extremum-seeking controller 402.

Still referring to FIG. 4, extremum-seeking controller 402 is shown receiving performance variable y at input interface 414 and providing performance variable y to a control loop 405 within controller 402. Control loop 405 is shown to include a high-pass filter 418, a demodulation element 428, a low-pass filter 420, an integrator 422, and a dither signal element 430. Control loop 405 may be configured to produce a performance gradient p from performance variable y using a dither-demodulation process. Integrator 422 analyzes the performance gradient p and adjusts the value of signal v to drive performance gradient p to zero.

The first step of the dither-demodulation process is performed by dither signal generator 426 and dither signal element 430. Dither signal element 430 receives a dither signal d from dither signal generator 426 and the signal v from integrator 422. Dither signal element 430 combines dither signal d with the signal v from integrator 422 to perturb the control input u provided to plant 404 (e.g., u=v+d). The perturbed control input u is provided to plant 404 via output interface 416 and used by plant 404 to generate performance variable y as previously described.

The second step of the dither-demodulation process is performed by high-pass filter 418, demodulation element 428, and low-pass filter 420. High-pass filter 418 filters the performance variable y and provides the filtered output to demodulation element 428. Demodulation element 428 demodulates the output of high-pass filter 418 by multiplying the filtered output by a demodulation signal m generated by a demodulation signal generator 424. Demodulation element 428 provides the demodulated output to low-pass filter 420, which extracts a performance gradient p from the demodulated output. The cutoff frequencies of high-pass filter 418 and low-pass filter 420 may be selected to extract gradient information from performance variable y at a particular dither frequency. In some embodiments, the demodulation signal m has the same frequency as the dither signal d to enhance the extraction of performance gradient p with respect to dither signal d.

Self-Configuring Extremum-Seeking Control System

Figure 5:
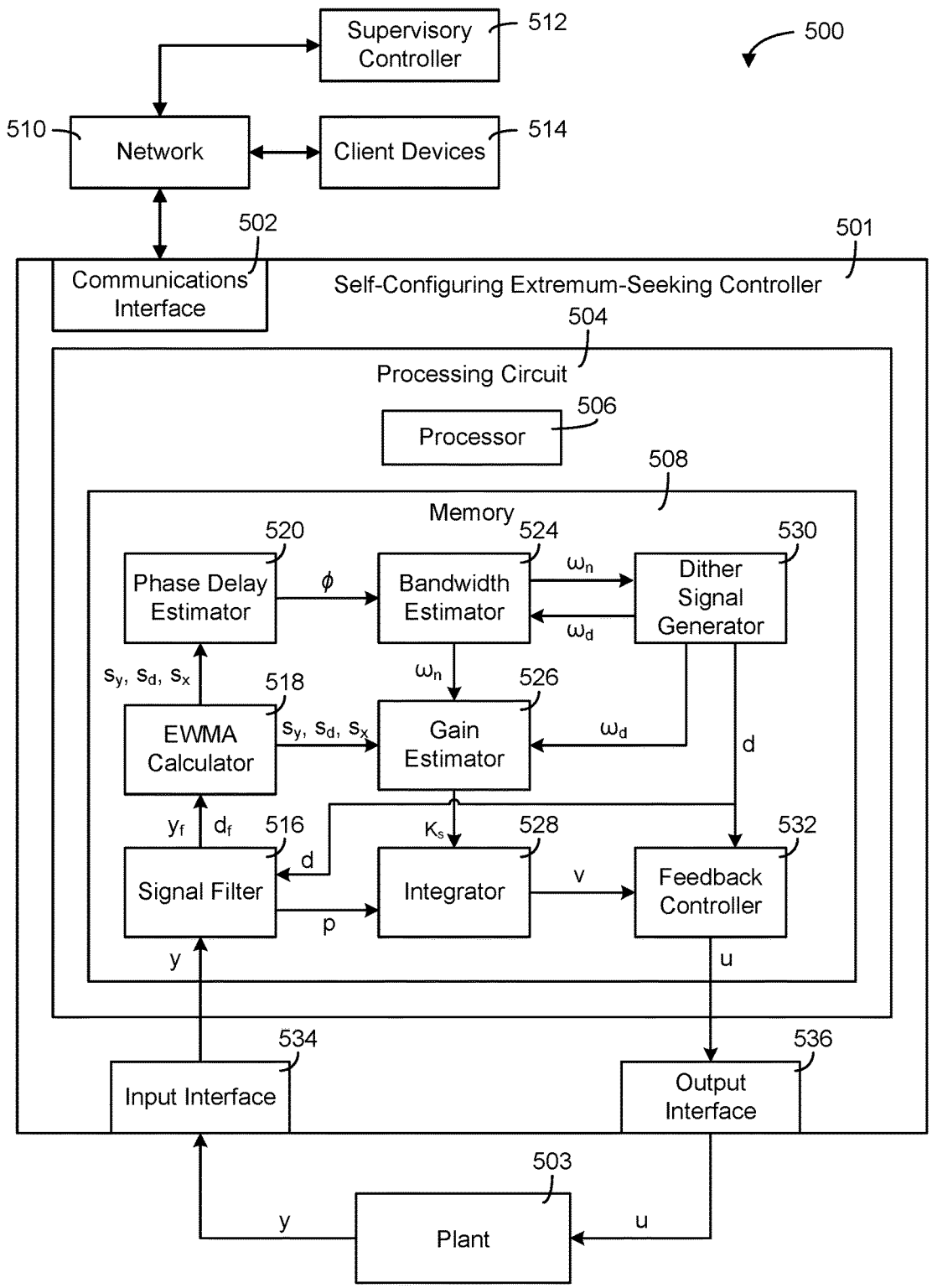
FIG. 5 is a block diagram of a self-configuring extremum-seeking control (SCESC) system including a SCESC controller and a plant, according to an exemplary embodiment.

Referring now to FIG. 5, a block diagram of a self-configuring extremum-seeking control (SCESC) system 500 is shown, according to an exemplary embodiment. SCESC system 500 is shown to include a plant 503 and a self-configuring extremum-seeking controller 501. Controller 501 may receive feedback from plant 503 via input interface 534 and provide control inputs to plant 503 via output interface 536. Controller 501 may operate in a manner similar to controllers 302, 352, and 402, as described with reference to FIGS. 3A-4. For example, controller 501 may use an extremum-seeking control (ESC) strategy to optimize a performance variable y received as an output from plant 503. Controller 501 may perturb the control input u to plant 503 with a dither signal d and analyze the effect of such perturbation on performance variable y. Controller 501 may adjust the control input u to drive the gradient of performance variable y to zero. In this way, controller 501 identifies values for control input u that achieve an optimal value (e.g., a maximum or a minimum) for performance variable y.

In some embodiments, the ESC logic implemented by controller 501 generates values for control input u based on a received control signal (e.g., a setpoint, an operating mode signal, etc.). The control signal may be received from a user control (e.g., a thermostat, a local user interface, etc.), client devices 514 (e.g., computer terminals, mobile user devices, cellular phones, laptops, tablets, desktop computers, etc.), a supervisory controller 512, or any other external system or device. In various embodiments, controller 501 may communicate with external systems and devices directly (e.g., using NFC, Bluetooth, WiFi direct, cables, etc.) or via a communications network 510 (e.g., a BACnet network, a LonWorks network, a LAN, a WAN, the Internet, a cellular network, etc.) using wired or wireless electronic data communications.

Although ESC does not require a model of the system to optimize performance variable y, properly configuring an ESC system may require knowledge of the system bandwidth (e.g., the natural frequency $\omega_n$ of plant 503) to select the frequency $\omega_d$ of the dither signal d. For example, it may be desirable to select a dither signal frequency $\omega_d$ that is the same or similar to the natural frequency $\omega_n$ of plant 503 to enhance the effect of dither signal d on the performance variable y (e.g., by increasing the resonance between dither signal d and plant 503). Additionally, it may be desirable to know the system gain $K_s$ in order to properly set the rate of gradient descent. Advantageously, SCESC controller 501 may be configured to automatically determine both the system bandwidth and the system gain using the dither signal d to perform system identification.

In some embodiments, SCESC controller 501 determines the natural frequency $\omega_n$ of plant 503 and uses the natural frequency $\omega_n$ as the system bandwidth. SCESC controller 501 may determine the natural frequency $\omega_n$ based on the phase delay $\phi$ between the dither signal d and the performance variable y. For example, SCESC controller 501 may excite plant 503 with a dither signal d having a known dither frequency $\omega_d$ and may measure the resultant phase delay $\phi$ of the performance variable y relative to the dither signal d. SCESC controller 501 may use the phase delay $\phi$ in conjunction with the dither signal frequency $\omega_d$ to estimate the natural frequency $\omega_n$, as shown in the following equation:

$$\omega_n = -\omega_d \left( \cot(\phi) - \sqrt{\frac{1}{\sin^2(\phi)}} \right)$$

SCESC controller 501 may use the natural frequency $\omega_n$ to set or update the dither signal frequency $\omega_d$ (e.g., by setting the dither signal frequency $\omega_d$ equal to the natural frequency $\omega_n$).

In some embodiments, SCESC controller 501 uses a history of values for the dither signal d to calculate an exponentially-weighted moving average (EWMA) $s_{d,k}$ of the dither signal d at time k. Similarly, SCESC controller 501 may use a history of values for the performance variable y to calculate an EWMA $s_{y,k}$ of the performance variable y at time k. SCESC controller 501 may use the EWMAs $s_{d,k}$ and $s_{y,k}$ in conjunction with the natural frequency $\omega_n$ and the known dither signal frequency $\omega_d$ to estimate the system gain $K_s$, as shown in the following equation:

$$K_s = \sqrt{\frac{s_{y,k}}{s_{d,k}} \left( \left(1 - \left(\frac{\omega_d}{\omega_n}\right)^2\right)^2 + \left(2\zeta \frac{\omega_d}{\omega_n}\right)^2 \right)}$$

SCESC controller 501 may use the system gain $K_s$ to set or update the rate of gradient descent. Advantageously, automatically determining the system bandwidth and the system gain enables SCESC system 500 to be configured automatically (e.g., without manual testing and configuration) and updated periodically as the ESC parameters and/or system conditions change.

Still referring to FIG. 5, controller 501 is shown to include a communications interface 502, an input interface 534, and an output interface 536. Interfaces 502 and 534-536 may include any number of jacks, wire terminals, wire ports, wireless antennas, or other communications interfaces for communicating information and/or control signals. Interfaces 502 and 534-536 may be the same type of devices or different types of devices. For example, input interface 534 may be configured to receive an analog feedback signal (e.g., an output variable, a measured signal, a sensor output, a controlled variable) from plant 503, whereas communications interface 502 may be configured to receive a digital setpoint signal from upstream supervisory controller 512 via network 510. Output interface 536 may be a digital output (e.g., an optical digital interface) configured to provide a digital control signal (e.g., a manipulated variable, a control input) to plant 503. In other embodiments, output interface 536 is configured to provide an analog output signal.

In some embodiments interfaces 502 and 534-536 can be joined as one or two interfaces rather than three separate interfaces. For example, communications interface 502 and input interface 534 may be combined as one Ethernet interface configured to receive network communications from supervisory controller 512. In some embodiments, supervisory controller 512 provides both a setpoint and process feedback via an Ethernet network (e.g., network 510). In such an embodiment, output interface 536 may be specialized for a controlled process component of plant 503. In other embodiments, output interface 536 can be another standardized communications interface for communicating data or control signals. Interfaces 502 and 534-536 can include communications electronics (e.g., receivers, transmitters, transceivers, modulators, demodulators, filters, communications processors, communication logic modules, buffers, decoders, encoders, encryptors, amplifiers, etc.) configured to provide or facilitate the communication of the signals described herein.

Still referring to FIG. 5, controller 501 is shown to include a processing circuit 504 having a processor 506 and memory 508. Processor 506 may be a general purpose or specific purpose processor, an application specific integrated circuit (ASIC), one or more field programmable gate arrays (FPGAs), a group of processing components, or other suitable processing components. Processor 506 is configured to execute computer code or instructions stored in memory 508 or received from other computer readable media (e.g., CDROM, network storage, a remote server, etc.).

Memory 508 may include one or more devices (e.g., memory units, memory devices, storage devices, etc.) for storing data and/or computer code for completing and/or facilitating the various processes described in the present disclosure. Memory 508 may include random access memory (RAM), read-only memory (ROM), hard drive storage, temporary storage, non-volatile memory, flash memory, optical memory, or any other suitable memory for storing software objects and/or computer instructions. Memory 508 may include database components, object code components, script components, or any other type of information structure for supporting the various activities and information structures described in the present disclosure. Memory 508 may be communicably connected to processor 506 via processing circuit 504 and may include computer code for executing (e.g., by processor 506) one or more processes described herein.

Still referring to FIG. 5, memory 508 is shown to include a signal filter 516. Signal filter 516 may be configured to filter the incoming performance variable signal y and the dither signal d to remove DC values from the two signals. In some embodiments, the performance variable signal y and the dither signal d have DC values that change slowly over time. Signal filter 516 may include a high-pass filter, a first-difference filter, or any other type of filter that filters the performance variable signal y and the dither signal d to remove the DC values from the signals. In other embodiments, the performance variable signal y and the dither signal d have constant DC values and signal filter 516 may be omitted.

In some embodiments, signal filter 516 smoothes the performance variable signal y and the dither signal d to reduce the effect of noise on such signals. For example, signal filter 516 may include a Savitzky Golay filter which can be applied to the differences of the performance variable signal y and the dither signal d to reduce the impact of noise without significantly affecting the phase of such signals. Signal filter 516 may provide a filtered performance variable signal $y_f$ and a filtered dither signal $d_f$ to EWMA calculator 518.

In some embodiments, signal filter 516 includes the functionality of high-pass filter 418, demodulation element 428, and/or low-pass filter 420, as described with reference to FIG. 4. For example, signal filter 516 may be configured to receive the feedback signal y from plant 503 via input interface 534 and to filter the feedback signal y using one or more high-pass filters and/or low-pass filters. The number of high-pass filters and low-pass filters used by signal filter 516 may depend on the number N of control inputs u provided to plant 503. In some embodiments, signal filter 516 includes a high-pass filter and a low-pass filter for each control input u. The cutoff frequencies of each high-pass filter and each low-pass filter may be selected to facilitate extracting performance gradient information from the feedback signal y at a particular dither frequency. In some embodiments, the values of the cutoff frequencies are determined by dither signal generator 530 based on the dither signal frequency $\omega_d$. Signal filter 516 may retrieve such values from dither signal generator 530 and use the values to tune the high-pass and low-pass filters.

In some embodiments, signal filter 516 includes a demodulation component. For example, signal filter 516 may be configured to generate one or more demodulation signals for use in demodulating the outputs from the high-pass filters. The number of demodulation signals generated may depend on the number of control inputs u (e.g., a separate demodulation signal for each control input u) and/or the number of high-pass filters (e.g., a separate demodulation signal for each high-pass filter). In some embodiments, each demodulation signal has a phase shift selected to maximize the cross-correlation between the demodulation signal and the output of the corresponding high-pass filter. In some embodiments, the demodulation frequencies and the phase shifts for the demodulation signals are determined by dither signal generator 530. Signal filter 516 may retrieve such values from dither signal generator 530 and use the values to generate the demodulation signals.

Signal filter 516 may include one or more demodulation elements (e.g., demodulation element 428) configured to multiply each demodulation signal with the output of the corresponding high-pass filter. Signal filter 516 may provide the product of each multiplication as an input to the corresponding low-pass filter. Advantageously, using multiple different dither signals and demodulation signals allows each control input to be independently isolated by defining different dither frequencies for each dither/demodulation signal pair. Accordingly, controller 501 can attribute a change in the performance variable signal y to a change in a particular control input u. Changes in the performance variable signal y caused by each control input u can be distinguished from each other and distinguished from changes caused by external disturbances and/or process noise.

Still referring to FIG. 5, memory 508 is shown to include an exponentially-weighted moving average (EWMA) calculator 518. EWMA calculator 518 may be configured to calculate EWMAs based on a history of time-series values of the performance variable signal y and the dither signal d. In some embodiments, EWMA calculator 518 uses the original performance variable signal y and the original dither signal d to calculate the EWMAs. In other embodiments, EWMA calculator 518 uses the filtered performance variable signal $y_f$ and the filtered dither signal $d_f$ to calculate the EWMAs. EWMA calculator 518 may recursively update the EWMA values each time a new value for the performance variable signal $y_f$ and the dither signal $d_f$ is received. Advantageously, EWMA calculator 518 allows controller 501 to track the performance variable signal $y_f$ and the dither signal $d_f$ without storing a batch of previous data values for each signal.

EWMA calculator 518 may generate a first EWMA $s_{d,k}$ based on a history of values for the dither signal d or the filtered dither signal $d_f$. The notation $s_{d,k}$ indicates that the variable $s_{d,k}$ represents the EWMA of the dither signal d (or filtered dither signal $d_f$) at time k. EWMA calculator 518 may generate the first EWMA $s_{d,k}$ using the following equation:

$$s_{d,k} = s_{d,k-1} + \frac{d_k^2 - s_{d,k-1}}{\min(k, N_p)}$$

where $s_{d,k}$ is the EWMA value at time k, $s_{d,k-1}$ is the previous EWMA value (i.e., at time k−1), $d_k$ is the value of the dither signal d or filtered dither signal $d_f$ at time k, and $N_p$ is the duration of the forgetting window. In some embodiments, EWMA calculator 518 generates a value for $N_p$ based on the dither signal frequency $\omega_d$ as shown in the following equation:

$$N_p = \frac{10(2\pi)}{\omega_d}$$

EWMA calculator 518 may generate a second EWMA $s_{y,k}$ based on a history of values for the performance variable signal y or the filtered performance variable signal $y_f$. The notation $s_{y,k}$ indicates that the variable $s_{y,k}$ represents the EWMA of the performance variable signal y (or the filtered performance variable signal $y_f$) at time k. EWMA calculator 518 may generate the second EWMA $s_{y,k}$ using the following equation:

$$s_{y,k} = s_{y,k-1} + \frac{y_k^2 - s_{y,k-1}}{\min(k, N_p)}$$

where $s_{y,k}$ is the EWMA value at time k, $s_{y,k-1}$ is the previous EWMA value (i.e., at time k−1), $y_k$ is the value of the performance variable signal y or the filtered performance variable signal $y_f$ at time k, and $N_p$ is the duration of the forgetting window.

In some embodiments, EWMA calculator 518 generates a third EWMA $s_{x,k}$ based on a product of the performance variable signal y (or the filtered performance variable signal $y_f$) and the dither signal d (or the filtered dither signal $d_f$). EWMA calculator 518 may generate the third EWMA $s_{x,k}$ using the following equation:

$$s_{x,k} = s_{x,k-1} + \frac{d_k y_k - s_{x,k-1}}{\min(k, N_p)}$$

where $s_{x,k}$ is the EWMA value at time k, $s_{x,k-1}$ is the previous EWMA value (i.e., at time k−1), $d_k$ is the value of the dither signal d or filtered dither signal $d_f$ at time k, $y_k$ is the value of the performance variable signal y or the filtered performance variable signal $y_f$ at time k, and $N_p$ is the duration of the forgetting window.

In some embodiments, EWMA calculator 518 updates the EWMA values $s_{d,k}$, $s_{y,k}$, and $s_{x,k}$ each time a new sample of the performance variable y and the dither signal d is received (e.g., at the beginning of each time step k). EWMA calculator 518 may provide the EWMA values $s_{d,k}$, $s_{y,k}$, and $s_{x,k}$ to phase delay estimator 520 for use in calculating the phase delay $\phi$ between the dither signal d and the performance variable signal y.

Still referring to FIG. 5, memory 508 is shown to include a phase delay estimator 520. Phase delay estimator 520 may be configured to estimate the phase delay $\phi$ between the dither signal d and the performance variable signal y. In some embodiments, phase delay estimator 520 estimates the phase delay $\phi$ using the original or filtered values for the performance variable signal y and the dither signal d. In other embodiments, phase delay estimator 520 estimates the phase delay $\phi$ using the EWMA values $s_{d,k}$, $s_{y,k}$, and $s_{x,k}$. Both embodiments are described in greater detail below.

According to the first exemplary embodiment, phase delay estimator 520 estimates the phase delay φ using the original or filtered values for the performance variable signal y and the dither signal d. For example, phase delay estimator 520 may estimate the phase delay φ using the following property of vectors:

$$\phi = \cos^{-1}\left(\frac{u_1 \cdot u_2}{\|u_1\|_2 \|u_2\|_2}\right)$$

where $u_1$ and $u_2$ are equal length vectors, $u_1 \cdot u_2$ is the dot product of the two vectors, and the notation $\|\ \|_2$ refers to the 2-norm. The dot product $u_1 \cdot u_2$ can be calculated using the following equation:

$$u_1 \cdot u_2 = \sum_{k=1}^{N} u_{1,k} u_{2,k}$$

and the 2-norms can be calculated using the following equations:

$$\|u_1\|_2 = \sqrt{\sum_{k=1}^{N} u_{1,k}^2} \quad \|u_2\|_2 = \sqrt{\sum_{k=1}^{N} u_{2,k}^2}$$

Phase delay estimator 520 may substitute the dither signal d (or the filtered dither signal $d_f$) for $u_1$ and the performance variable signal y (or the filtered performance variable signal $y_f$) for $u_2$ to estimate the phase delay between the dither signal and the performance variable signal.

According to the second exemplary embodiment, phase delay estimator 520 estimates the phase delay φ using the EWMA values $s_{d,k}$, $s_{y,k}$, and $s_{x,k}$. For example, phase delay estimator 520 may estimate the phase delay $\hat{\phi}_k$ at time k using the following equation:

$$\hat{\phi}_k = \cos^{-1}\left(\frac{s_{x,k}}{\sqrt{s_{d,k} s_{y,k}}}\right)$$

Phase delay estimator 520 may provide the phase delay φ and/or $\hat{\phi}_k$ to bandwidth estimator 524 for use in estimating the system bandwidth.

Still referring to FIG. 5, memory 508 is shown to include a bandwidth estimator 524. Bandwidth estimator 524 may estimate the natural frequency $\omega_n$ of the system and use the natural frequency $\omega_n$ as the system bandwidth. Bandwidth estimator 524 may estimate the natural frequency $\omega_n$ based on the assumption that the transfer function between the dither signal d and the performance variable signal y can be approximated as second order, as shown in the following equation:

$$G(s) \approx \frac{\omega_n^2}{s^2 + 2\zeta\omega_n s + \omega_n^2}$$

where ζ is the damping coefficient and $\omega_n$ is the natural frequency of the system. The natural frequency $\omega_n$ may be assumed to be equivalent to the system bandwidth.

From this transfer function, it follows that the phase delay φ between the dither signal d and the performance variable signal y is:

$$\phi = -\tan^{-1}\left(\frac{2\zeta\frac{\omega_d}{\omega_n}}{1 - \frac{\omega_d^2}{\omega_n^2}}\right)$$

which can be simplified by assuming that plant 503 is critically damped (i.e., ζ=1). The previous equation can be rearranged into a quadratic form that provides $\omega_n$ as a function of the dither signal frequency $\omega_d$ and the phase delay φ as follows:

$$\omega_n^2 + \frac{2\omega_d}{\tan(\phi)}\omega_n - \omega_d^2 = 0$$

This quadratic equation can be solved to give two frequencies for $\omega_n$, one positive frequency and one negative frequency. The positive frequency is given by:

$$\omega_n = -\omega_d\left(\cot(\phi) - \sqrt{\frac{1}{\sin^2(\phi)}}\right)$$

For the embodiment in which phase delay estimator 520 uses the original or filtered values of the dither signal d and the performance variable signal y to estimate the phase delay φ, bandwidth estimator 524 may estimate the natural frequency $\omega_n$ as a function of the known dither signal frequency $\omega_d$ and the phase delay φ using the previous equation. For example, bandwidth estimator 524 is shown receiving the phase delay φ from phase delay estimator 520 and the dither signal frequency $\omega_d$ from dither signal generator 530. Bandwidth estimator 524 may use the dither signal frequency $\omega_d$ and the phase delay φ to calculate $\omega_n$ as shown in the previous equation. Bandwidth estimator 524 may store or use the natural frequency $\omega_n$ as the system bandwidth.

For the embodiment in which phase delay estimator 520 uses the EWMA values $s_{d,k}$, $s_{y,k}$, and $s_{x,k}$ to estimate the phase delay $\hat{\phi}_k$, bandwidth estimator 524 may estimate the natural frequency $\hat{\omega}_{n,k}$ at time k using the following equation:

$$\hat{\omega}_{n,k} = -\omega_d\left(\cot(\hat{\phi}_k) - \sqrt{\frac{1}{\sin^2(\hat{\phi}_k)}}\right)$$

For example, bandwidth estimator 524 may receive the estimated phase delay $\hat{\phi}_k$ from phase delay estimator 520 and the dither signal frequency $\omega_d$ from dither signal generator 530. Bandwidth estimator 524 may use the dither signal frequency $\omega_d$ and the estimated phase delay $\hat{\phi}_k$ to calculate $\hat{\omega}_{n,k}$ as shown in the previous equation. Bandwidth estimator 524 may store or use the natural frequency $\hat{\omega}_{n,k}$ as the system bandwidth at time k.

Still referring to FIG. 5, memory 508 is shown to include a gain estimator 526. Gain estimator 526 may be configured to estimate the system gain $K_s$ based on the natural frequency $\omega_n$ or $\hat{\omega}_{n,k}$ received from bandwidth estimator 524. The system gain $K_s$ may be used by controller 501 (e.g., integrator 528) to scale the step size of the internal gradient descent procedure employed by controller 501.

In some embodiments, gain estimator 526 estimates the system gain $K_s$ based on the following equation describing the magnitude of a second-order system:

$$|H(j\omega_d)| = \frac{K_s}{\sqrt{\left(1-\left(\frac{\omega_d}{\omega_n}\right)^2\right)^2 + \left(2\zeta\frac{\omega_d}{\omega_n}\right)^2}}$$

where the system gain $K_s$ is unknown. The actual magnitude of the performance variable signal y relative to the dither signal d is the ratio of the ranges of the performance variable signal y and the dither signal d. In other words, the magnitude $|H(j\omega_d)|$ may be equal to the ratio of the range of the performance variable signal y (i.e., $\sigma_y$) to the range of the dither signal d (i.e., $\sigma_d$), as shown in the following equation:

$$|H(j\omega_d)| = \frac{\sigma_y}{\sigma_d}$$

In various embodiments, the ranges $\sigma_y$ and $\sigma_d$ may represent a difference between a maximum and minimum value of the corresponding signal, a standard deviation of the signal, or any other metric that quantifies a range or spread of a plurality of data values.

In some embodiments, gain estimator 526 uses the EWMA values $s_{d,k}$ and $s_{y,k}$ as the variances of the dither signal d and the performance variable signal y, respectively. These EWMA values are measures of the variable ranges squared (e.g., $s_{d,k}=\sigma_d^2$, and $s_{y,k}=\sigma_y^2$). Accordingly, the square root of the ratio $$\frac{s_{y,k}}{s_{d,k}}$$

may be substituted for $|H(j\omega_d)|$ as shown in the following equation:

$$\sqrt{\frac{s_{y,k}}{s_{d,k}}} = \frac{K_s}{\sqrt{\left(1-\left(\frac{\omega_d}{\omega_n}\right)^2\right)^2 + \left(2\zeta\frac{\omega_d}{\omega_n}\right)^2}}$$

which can be solved for $K_s$ as follows:

$$K_s = \sqrt{\frac{s_{y,k}}{s_{d,k}}\left(\left(1-\left(\frac{\omega_d}{\omega_n}\right)^2\right)^2 + \left(2\zeta\frac{\omega_d}{\omega_n}\right)^2\right)}$$

Gain estimator 526 is shown receiving the EWMA values $s_{d,k}$ and $s_{y,k}$ from EWMA calculator 518, the natural frequency $\omega_n$ from bandwidth estimator 524, and the dither signal frequency $\omega_d$ from dither signal generator 530. Gain estimator 526 may use the previous equation to calculate $K_s$ as a function of the EWMA values $s_{d,k}$ and $s_{y,k}$, the natural frequency $\omega_n$ and the dither signal frequency $\omega_d$, assuming that the plant is critically damped (i.e., $\zeta=1$). In some embodiments, gain estimator 526 provides the system gain $K_s$ to integrator 528 for use in scaling the step size of the internal gradient descent procedure performed by controller 501.

Still referring to FIG. 5, memory 508 is shown to include an integrator 528. Integrator 528 may be the same or similar to integrator 422, as described with reference to FIG. 4. For example, integrator 528 may receive the performance gradient p from signal filter 516 and may operate to drive the performance gradient p to zero. For embodiments in which controller 501 generates multiple control inputs u, integrator 528 includes a plurality of integrators (e.g., one for each control input u). Integrator 528 may use the system gain $K_s$ as an integral gain (e.g., $K_s/s$) to generate a value for the manipulated variable v. For example, integrator 528 may generate manipulated variable values v that drive the performance gradient p to zero. The variable v may be subsequently modified by feedback controller 532 to generate the control input u (e.g., by modifying the variable v with the dither signal d).

Still referring to FIG. 5, memory 508 is shown to include a dither signal generator 530. Dither signal generator 530 may be configured to generate one or more dither signals for use in perturbing the control inputs u provided to plant 503. The number of dither signals generated by dither signal generator 530 may depend on the number of control inputs u. In some embodiments, dither signal generator 530 generates a dither signal d for each of the control inputs u. Dither signal generator 530 may generate the dither signal d according to signal parameters such as a dither amplitude $A_d$ and a dither frequency $\omega_d$. In other words, the dither signal d may have a dither amplitude $A_d$ and a dither frequency $\omega_d$.

Dither signal generator 530 may select the dither amplitude $A_d$ such that the input perturbation is no larger than 10% of the total input range. In some embodiments, dither signal generator 530 selects the dither amplitude $A_d$ such that the corresponding dithered output amplitude of performance variable signal y (i.e., the amplitude of perturbation caused by dither signal d) is at least twice the noise amplitude. Dither signal generator 530 may select the dither frequency $\omega_d$ based on the natural frequency $\omega_n$ or natural frequency estimate $\hat{\omega}_{n,k}$ received from bandwidth estimator 524. For example, dither signal generator 530 may select the dither frequency $\omega_d$ to be equal to the natural frequency $\omega_n$ or a multiple of the natural frequency $\omega_n$.

Dither signal generator 530 may provide the dither frequency $\omega_d$ to bandwidth estimator 524 for use in calculating the natural frequency $\omega_n$. Dither signal generator 530 may also provide the dither frequency $\omega_d$ to gain estimator 526 for use in calculating the system gain $K_s$. Dither signal generator 530 may provide the dither signal d to feedback controller 532 for use in generating the control input u.

Still referring to FIG. 5, memory 508 is shown to include a feedback controller 532. Feedback controller 532 may be configured to operate controller 501 in a closed-loop operating mode. Feedback controller 532 may include one or more processing elements (e.g., dither signal element 430) configured to generate a perturbed control input u using the generated dither signal d. For example, feedback controller 532 may generate a perturbed control input u by adding the dither signal d to the output v provided by integrator 528 (e.g., u=v+d). In some embodiments, feedback controller 532 receives multiple outputs v from integrator 528 and multiple dither signals d from dither signal generator 530. Feedback controller 532 may modify each output v using a different dither signal d having a different dither frequency. In other embodiments, feedback controller 532 receives a single dither signal d and a single output v as shown in FIG. 5. Feedback controller 532 may provide the perturbed control input u to plant 503 via output interface 536.

Self-Configuring Extremum-Seeking Control Processes

Figure 6:
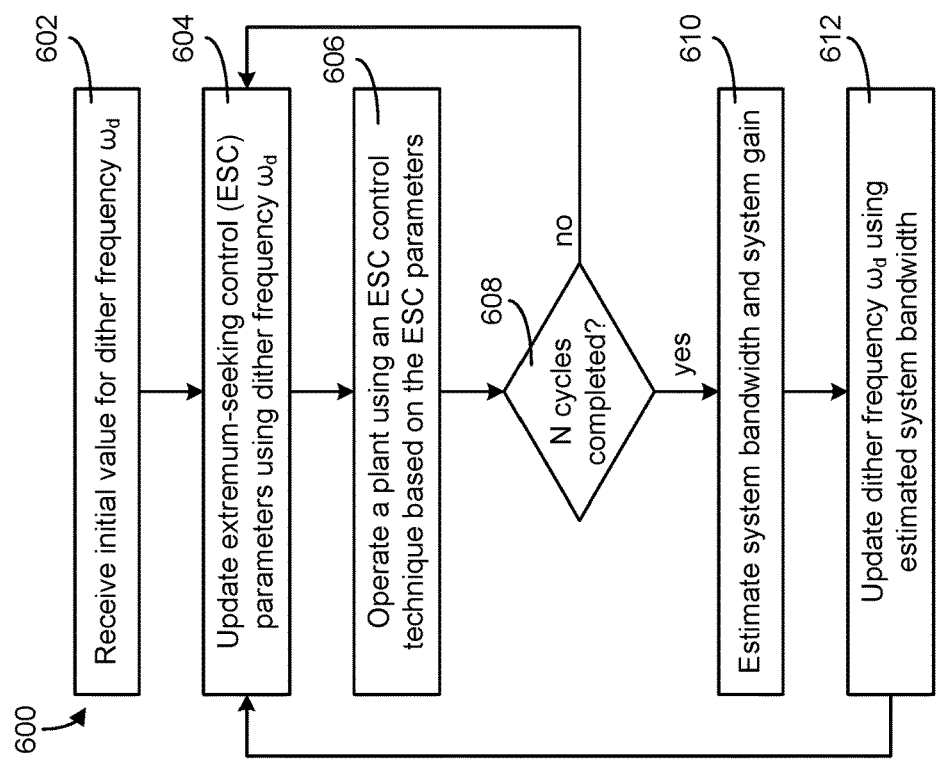
FIG. 6 is a flowchart of a process for automatically configuring an ESC system which may be performed by the SCESC controller of FIG. 5, according to an exemplary embodiment.

Referring now to FIG. 6, a flowchart of a process 600 for automatically configuring an extremum-seeking control (ESC) system is shown, according to an exemplary embodiment. Process 600 may be performed by one or more components of self-configuring extremum-seeking controller 501 to automatically determine ESC parameters such as the dither signal frequency $\omega_d$ and the system gain $K_s$. Controller 501 may use the ESC parameters to operate a plant (e.g., plant 503) using an extremum-seeking control technique.

Process 600 is shown to include receiving an initial value for a dither frequency $\omega_d$ (step 602). The initial value for the dither frequency $\omega_d$ may be retrieved from memory, specified by a user, received from an external system or device, automatically determined by controller 501, or obtained from any other data source. In some embodiments, the initial value of the dither frequency $\omega_d$ is based on knowledge of the system. For example, the initial value of the dither frequency $\omega_d$ may be determined using a system identification procedure. In other embodiments, the initial value of the dither frequency $\omega_d$ is a standard value pre-programmed into controller 501. Advantageously, the initial value of the dither frequency $\omega_d$ does not need to be selected based on knowledge of the system since the dither frequency $\omega_d$ is automatically updated in subsequent steps of process 600.

Process 600 is shown to include updating extremum-seeking control (ESC) parameters using the dither frequency $\omega_d$ (step 604). ESC control parameters may include any parameters or variables used by controller 501 when performing an extremum-seeking control process. For example, step 604 may include generating a dither signal d using the dither frequency $\omega_d$. In some embodiments, step 604 includes receiving an output signal y from the plant, which may be the same as the performance variable signal y previously described. Throughout this disclosure the terms "performance variable signal y" and "output signal y" are used interchangeably to refer to the monitored variable y received from the plant. ESC control parameters generated in step 604 may include a dot product of the dither signal d and the output signal y and/or 2-norms of the dither signal d and the output signal y. For example, step 604 may include calculating the dot product of the dither signal d and the output signal y using the following equation:

$$u_1 \cdot u_2 = \sum_{k=1}^{N} u_{1,k} u_{2,k}$$

where $u_1$ is the dither signal and $u_2$ is the output signal y. Step 604 may include calculating 2-norms of dither signal d and the output signal y using the following equations:

$$\|u_1\|_2 = \sqrt{\sum_{k=1}^{N} u_{1,k}^2} \quad \|u_2\|_2 = \sqrt{\sum_{k=1}^{N} u_{2,k}^2}$$

where $u_1$ is the dither signal and $u_2$ is the output signal y.

In some embodiments, step 604 includes calculating EWMAs of the dither signal d and the output signal y. For example, step 604 may include generating a first EWMA $s_{d,k}$ based on a history of values for the dither signal d or the filtered dither signal $d_f$. The notation $s_{d,k}$ indicates that the variable $s_{d,k}$ represents the EWMA of the dither signal d (or filtered dither signal $d_f$) at time k. The first EWMA $s_{d,k}$ may be generated using the following equation:

$$s_{d,k} = s_{d,k-1} + \frac{d_k^2 - s_{d,k-1}}{\min(k, N_p)}$$

where $s_{d,k}$ is the EWMA value at time k, $s_{d,k-1}$ is the previous EWMA value (i.e., at time k−1), $d_k$ is the value of the dither signal d or filtered dither signal $d_f$ at time k, and $N_p$ is the duration of the forgetting window. In some embodiments, step 604 includes generating a value for $N_p$ based on the dither signal frequency $\omega_d$ as shown in the following equation:

$$N_p = \frac{10(2\pi)}{\omega_d}$$

Step 604 may include generating a second EWMA $s_{y,k}$ based on a history of values for the output signal y or the filtered output signal $y_f$. The notation $s_{y,k}$ indicates that the variable $s_{y,k}$ represents the EWMA of the output signal y (or the filtered output signal $y_f$) at time k. The second EWMA $s_{y,k}$ may be generated using the following equation:

$$s_{y,k} = s_{y,k-1} + \frac{y_k^2 - s_{y,k-1}}{\min(k, N_p)}$$

where $s_{y,k}$ is the EWMA value at time k, $s_{y,k-1}$ is the previous EWMA value (i.e., at time k−1), $y_k$ is the value of the output signal y or the filtered output signal $y_f$ at time k, and $N_p$ is the duration of the forgetting window.

In some embodiments, step 604 includes generating a third EWMA $s_{x,k}$ based on a product of the output signal y (or the filtered output signal $y_f$) and the dither signal d (or the filtered dither signal $d_f$). The third EWMA $s_{x,k}$ may be generated using the following equation:

$$s_{x,k} = s_{x,k-1} + \frac{d_k y_k - s_{x,k-1}}{\min(k, N_p)}$$

where $s_{x,k}$ is the EWMA value at time k, $s_{x,k-1}$ is the previous EWMA value (i.e., at time k−1), $d_k$ is the value of the dither signal d or filtered dither signal $d_f$ at time k, $y_k$ is the value of the output signal y or the filtered output signal $y_f$ at time k, and $N_p$ is the duration of the forgetting window. In some embodiments, step 604 includes updating the EWMA values $s_{d,k}$, $s_{y,k}$, and $s_{x,k}$ each time a new sample of the output signal y and the dither signal d is received (e.g., at the beginning of each time step k).

Step 604 may include calculating a value for the system gain $K_s$. The system gain $K_s$ may be calculated at the beginning of each time step k based on the current EWMA values $s_{d,k}$ and $s_{y,k}$, the current dither frequency $\omega_d$, and the current estimate of the system bandwidth (e.g., natural frequency $\omega_n$) as shown in the following equation:

$$K_s = \sqrt{\frac{s_{y,k}}{s_{d,k}}\left(\left(1-\left(\frac{\omega_d}{\omega_n}\right)^2\right)^2 + \left(2\zeta\frac{\omega_d}{\omega_n}\right)^2\right)}$$

Still referring to FIG. 6, process 600 is shown to include operating a plant using an ESC control technique based on the ESC parameters (step 606). Step 606 may include using the ESC parameters to generate a dither signal d and using the dither signal d to perturb a control input u for the plant. Step 606 may include monitoring the output signal y from the plant resulting from the perturbed control input u and extracting a performance gradient p from the output signal y. For example, step 606 may include performing a dither-demodulation process to drive the performance gradient to zero, as described with reference to FIGS. 3A-5.

Process 600 is shown to include determining whether a threshold number N of cycles have been completed (step 608). If the threshold number N of cycles (e.g., N≈10) have not been completed (i.e., the result of step 608 is "no"), process 600 may return to step 604 and steps 604-608 may be repeated. However, if the threshold number N of cycles have been completed (i.e., the result of step 608 is "yes"), process 600 may advance to step 610. In some embodiments, the threshold number N defines a threshold number of time steps k or a threshold amount of time relative to a predetermined point in time. For example, the predetermined point in time may be the beginning of process 600 or the time at which the dither frequency $\omega_d$ was most recently updated. In other embodiments, the threshold number N defines a threshold number of samples of the dither signal d and/or output variable y collected since the predetermined point in time (e.g., N≈1000 at a sampling rate of approximately 100 samples per cycle). In some embodiments, the threshold number N defines a threshold number of times steps 604-608 have been performed since the dither frequency $\omega_d$ was most recently updated.

Still referring to FIG. 6, process 600 is shown to include estimating the system bandwidth and the system gain (step 610). Step 610 may be performed by phase delay estimator 520, bandwidth estimator 524, and gain estimator 526, as described with reference to FIG. 5. For example, step 610 may include estimating the phase delay φ between the dither signal d and the output signal y using the following equation:

$$\phi = \cos^{-1}\left(\frac{u_1 \cdot u_2}{\|u_1\|_2 \|u_2\|_2}\right)$$

where $u_1$ is the dither signal d, $u_2$ is the output signal y from the plant, $u_1 \cdot u_2$ is the dot product calculated in step 604, and $\|u_1\|_2$ and $\|u_2\|_2$ are the 2-norms calculated in step 604. In other embodiments, step 610 may include estimating the phase delay $\hat{\phi}_k$ at time k based on the EWMA values $s_{d,k}$, $s_{y,k}$, and $s_{x,k}$ calculated in step 604. For example, the phase delay $\hat{\phi}_k$ at time k may be estimated using the following equation:

$$\hat{\phi}_k = \cos^{-1}\left(\frac{s_{x,k}}{\sqrt{s_{d,k}s_{y,k}}}\right)$$

In some embodiments, step 610 includes using the phase delay φ and the dither signal frequency $\omega_d$ to calculate the system bandwidth $\omega_n$ using the following equation.

$$\omega_n = -\omega_d\left(\cot(\phi) - \sqrt{\frac{1}{\sin^2(\phi)}}\right)$$

In other embodiments, step 610 may include using the phase delay $\hat{\phi}_k$ at time k and the dither signal frequency $\omega_d$ to estimate the system bandwidth $\hat{\omega}_{n,k}$ at time k using the following equation:

$$\hat{\omega}_{n,k} = -\omega_d\left(\cot(\hat{\phi}_k) - \sqrt{\frac{1}{\sin^2(\hat{\phi}_k)}}\right)$$

Step 610 may include estimating the system gain $K_s$ using the following equation:

$$K_s = \sqrt{\frac{s_{y,k}}{s_{d,k}}\left(\left(1-\left(\frac{\omega_d}{\omega_n}\right)^2\right)^2 + \left(2\zeta\frac{\omega_d}{\omega_n}\right)^2\right)}$$

where $s_{y,k}$ and $s_{d,k}$ are the EWMA values calculated in step 604, $\omega_d$ is the current value of the dither signal frequency, and $\omega_n$ is the estimated system bandwidth (e.g., $\omega_n$ or $\hat{\omega}_{n,k}$).

Still referring to FIG. 6, process 600 is shown to include updating the dither frequency $\omega_d$ using the estimated system bandwidth (step 612). Step 612 may include selecting a new dither frequency $\omega_d$ using the system bandwidth $\omega_n$ or estimated system bandwidth $\hat{\omega}_{n,k}$ calculated in step 610. It may be desirable to select a dither signal frequency $\omega_d$ that is the same or similar to the system bandwidth $\omega_n$ to enhance the effect of the dither signal d on the performance variable y (e.g., by increasing the resonance between dither signal d and plant 503). For example, step 612 may include selecting a new dither frequency $\omega_d$ that is equal to the system bandwidth $\omega_n$ or a multiple of the system bandwidth $\omega_n$.

The updated dither frequency $\omega_d$ may be stored in memory and used in subsequent iterations of process 600 to generate the dither signal d. In some embodiments, the updated dither frequency $\omega_d$ is used to calculate an updated value for the system gain $K_s$ as previously described. After updating the dither frequency $\omega_d$ in step 612, process 600 may return to step 604. Steps 604-612 may be repeated iteratively to automatically update the dither frequency $\omega_d$, system gain $K_s$, and/or other ESC configuration parameters as conditions change.

Figure 7:
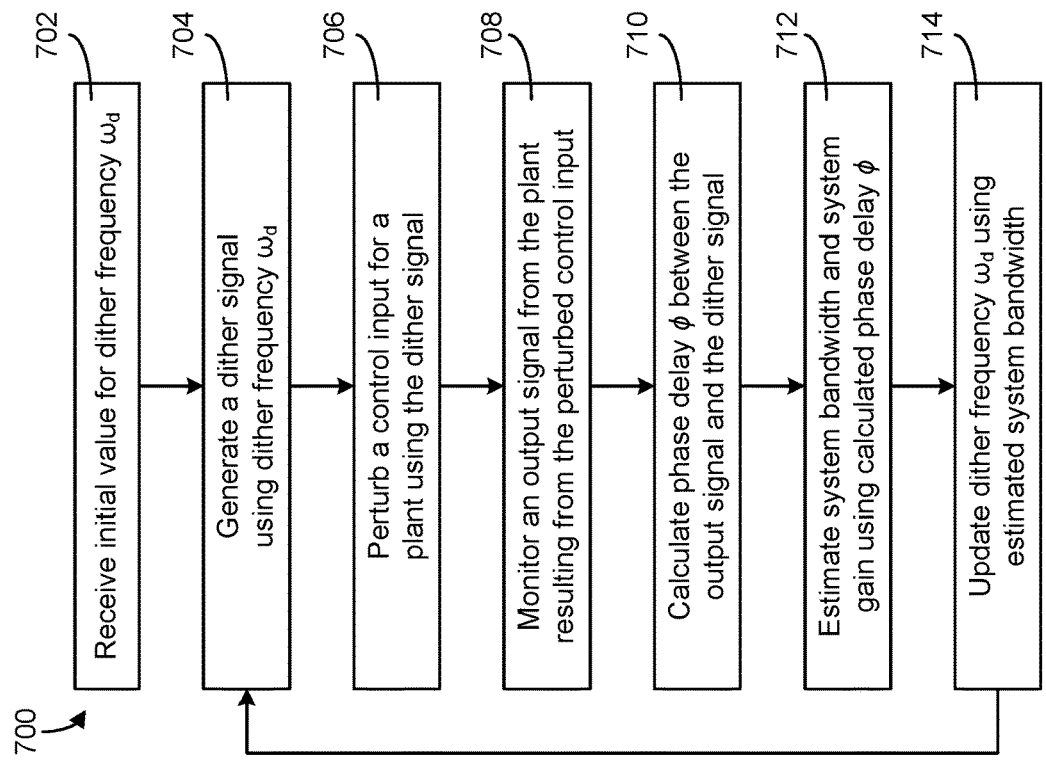
FIG. 7 is a flowchart of another process for automatically configuring an ESC system which may be performed by the SCESC controller of FIG. 5, according to an exemplary embodiment.

Referring now to FIG. 7, a flowchart of another process 700 for automatically configuring an extremum-seeking control (ESC) system is shown, according to an exemplary embodiment. Process 700 may be performed by one or more components of self-configuring extremum-seeking controller 501 to automatically determine ESC parameters such as the dither signal frequency $\omega_d$ and the system gain $K_s$. Controller 501 may use the ESC parameters to operate a plant (e.g., plant 503) using an extremum-seeking control technique.

Process 700 is shown to include receiving an initial value for a dither frequency $\omega_d$ (step 702). The initial value for the dither frequency $\omega_d$ may be retrieved from memory, specified by a user, received from an external system or device, automatically determined by controller 501, or obtained from any other data source. In some embodiments, the initial value of the dither frequency $\omega_d$ is based on knowledge of the system. For example, the initial value of the dither frequency $\omega_d$ may be determined using a system identification procedure. In other embodiments, the initial value of the dither frequency $\omega_d$ is a standard value pre-programmed into controller 501. Advantageously, the initial value of the dither frequency $\omega_d$ does not need to be selected based on knowledge of the system since the dither frequency $\omega_d$ is automatically updated in subsequent steps of process 700.

Process 700 is shown to include generating a dither signal d using the dither frequency $\omega_d$ (step 704) and perturbing a control input u for a plant using the dither signal d (step 706). The dither signal d may be a sinusoidal disturbance of a known frequency (i.e., the dither frequency $\omega_d$) and may be applied (e.g., added) to the control input u provided to the plant. The dither signal d may be generated according to dither signal parameters such as a dither amplitude $A_d$ and a dither frequency $\omega_d$. In other words, the dither signal d may have a dither amplitude $A_d$ and a dither frequency $\omega_d$. Step 706 may include adding the dither signal d to the output v of an integrator (e.g., integrator 528) to generate the control input u for the plant (e.g., u=v+d).

In some embodiments, step 704 includes selecting the dither amplitude $A_d$ such that the input perturbation is no larger than 10% of the total input range. In some embodiments, step 704 includes selecting the dither amplitude $A_d$ such that the corresponding dithered output amplitude of the performance variable signal y (i.e., the amplitude of perturbation caused by dither signal d) is at least twice the noise amplitude. Step 704 may include selecting the dither frequency $\omega_d$ based on the natural frequency $\omega_n$ or natural frequency estimate $\hat{\omega}_{n,k}$ received in step 702 or determined in a previous iteration of process 700. For example, step 704 may include selecting the dither frequency $\omega_d$ to be equal to the natural frequency $\omega_n$ or a multiple of the natural frequency $\omega_n$. In some embodiments, step 704 includes generating multiple dither signals. The number of dither signals generated in step 704 may depend on the number of control inputs u provided to the plant. In some embodiments, step 704 includes generating a dither signal d for each of the control inputs u.

In some embodiments, step 704 includes calculating an EWMA of the dither signal d. For example, step 704 may include generating a first EWMA $s_{d,k}$ based on a history of values for the dither signal d. The notation $s_{d,k}$ indicates that the variable $s_{d,k}$ represents the EWMA of the dither signal d (or filtered dither signal $d_f$) at time k. The first EWMA $s_{d,k}$ may be generated using the following equation:

$$s_{d,k} = s_{d,k-1} + \frac{d_k^2 - s_{d,k-1}}{\min(k, N_p)}$$

where $s_{d,k}$ is the EWMA value at time k, $s_{d,k-1}$ is the previous EWMA value (i.e., at time k−1), $d_k$ is the value of the dither signal d or filtered dither signal $d_f$ at time k, and $N_p$ is the duration of the forgetting window. In some embodiments, step 704 includes updating the EWMA value $s_{d,k}$ each time a new sample of the dither signal d is received (e.g., at the beginning of each time step k). In some embodiments, step 704 includes generating a value for $N_p$ based on the dither signal frequency $\omega_d$ as shown in the following equation:

$$N_p = \frac{10(2\pi)}{\omega_d}$$

Still referring to FIG. 7, process 700 is shown to include monitoring an output signal y from the plant resulting from the perturbed control input u (step 708). The plant uses the control input u to affect a controlled process (e.g., as a control signal for building equipment) and outputs a performance measure in the form of an output signal y. The output signal y may represent a measured or calculated variable that the controller seeks to optimize using an extremum-seeking control process. Optimizing output signal y may include minimizing y, maximizing y, controlling y to achieve a setpoint, or otherwise regulating the value of output signal y by adjusting the value of control input u. Step 708 may include observing the value of output signal y over time and storing the value of output signal y in memory of the controller.

In some embodiments, step 708 includes generating a second EWMA $s_{y,k}$ based on a history of values for the output signal y. The notation $s_{y,k}$ indicates that the variable $s_{y,k}$ represents the EWMA of the output signal y (or the filtered output signal $y_f$) at time k. The second EWMA $s_{y,k}$ may be generated using the following equation:

$$s_{y,k} = s_{y,k-1} + \frac{y_k^2 - s_{y,k-1}}{\min(k, N_p)}$$

where $s_{y,k}$ is the EWMA value at time k, $s_{y,k-1}$ is the previous EWMA value (i.e., at time k−1), $y_k$ is the value of the output signal y or the filtered output signal $y_f$ at time k, and $N_p$ is the duration of the forgetting window.

In some embodiments, step 708 includes generating a third EWMA $s_{x,k}$ based on a product of the output signal y (or the filtered output signal $y_f$) and the dither signal d (or the filtered dither signal $d_f$). The third EWMA $s_{x,k}$ may be generated using the following equation:

$$s_{x,k} = s_{x,k-1} + \frac{d_k y_k - s_{x,k-1}}{\min(k, N_p)}$$

where $s_{x,k}$ is the EWMA value at time k, $s_{x,k-1}$ is the previous EWMA value (i.e., at time k−1), $d_k$ is the value of the dither signal d or filtered dither signal $d_f$ at time k, $y_k$ is the value of the output signal y or the filtered output signal $y_f$ at time k, and $N_p$ is the duration of the forgetting window. In some embodiments, step 708 includes updating the EWMA values $s_{y,k}$ and $s_{x,k}$ each time a new sample of the output signal y and the dither signal d is received (e.g., at the beginning of each time step k).

Still referring to FIG. 7, process 700 is shown to include calculating a phase delay $\phi$ between the output signal y and the dither signal d (step 710). Step 710 may be performed by phase delay estimator 520, as described with reference to FIG. 5. In some embodiments, step 710 includes estimating the phase delay $\phi$ using the original or filtered values for the output signal y and the dither signal d. For example, step 710 may include estimating the phase delay $\phi$ using the following property of vectors:

$$\phi = \cos^{-1}\left(\frac{u_1 \cdot u_2}{\|u_1\|_2 \|u_2\|_2}\right)$$

where $u_1$ and $u_2$ are equal length vectors representing the dither signal d and the output signal y, respectively, $u_1 \cdot u_2$ is the dot product of the two vectors, and the notation $\|\,\|_2$ refers to the 2-norm. The dot product $u_1 \cdot u_2$ can be calculated using the following equation:

$$u_1 \cdot u_2 = \sum_{k=1}^{N} u_{1,k} u_{2,k}$$

and the 2-norms can be calculated using the following equations:

$$\|u_1\|_2 = \sqrt{\sum_{k=1}^{N} u_{1,k}^2} \quad \|u_2\|_2 = \sqrt{\sum_{k=1}^{N} u_{2,k}^2}$$

Step 710 may include substituting the dither signal d (or the filtered dither signal $d_f$) for $u_1$ and the output signal y (or the filtered output signal $y_f$) for $u_2$ to estimate the phase delay between the dither signal d and the output signal y.

In other embodiments, step 710 includes estimating the phase delay $\phi$ using the EWMA values $s_{d,k}$, $s_{y,k}$, and $s_{x,k}$. For example, step 710 may include estimating the phase delay $\hat{\phi}_k$ at time k using the following equation:

$$\hat{\phi}_k = \cos^{-1}\left(\frac{s_{x,k}}{\sqrt{s_{d,k} s_{y,k}}}\right)$$

The phase delay $\phi$ and/or $\hat{\phi}_k$ may be stored in memory for use in subsequent steps of process 700.

Still referring to FIG. 7, process 700 is shown to include estimating the system bandwidth $\omega_n$ and the system gain $K_s$ using the estimated phase delay $\phi$ (step 712). Step 712 may be performed by bandwidth estimator 524 and gain estimator 526, as described with reference to FIG. 5. In some embodiments, step 712 includes using the phase delay $\phi$ and the dither signal frequency $\omega_d$ to calculate the system bandwidth $\omega_n$ using the following equation.

$$\omega_n = -\omega_d\left(\cot(\phi) - \sqrt{\frac{1}{\sin^2(\phi)}}\right)$$

In other embodiments, step 712 may include using the phase delay $\hat{\phi}_k$ at time k and the dither signal frequency $\omega_d$ to estimate the system bandwidth $\hat{\omega}_{n,k}$ at time k using the following equation:

$$\hat{\omega}_{n,k} = -\omega_d\left(\cot(\hat{\phi}_k) - \sqrt{\frac{1}{\sin^2(\hat{\phi}_k)}}\right)$$

Step 712 may include estimating the system gain $K_s$ using the following equation:

$$K_s = \sqrt{\frac{s_{y,k}}{s_{d,k}}\left(\left(1 - \left(\frac{\omega_d}{\omega_n}\right)^2\right)^2 + \left(2\zeta\frac{\omega_d}{\omega_n}\right)^2\right)}$$

where $s_{y,k}$ and $s_{d,k}$ are the EWMA values calculated in steps 704-708, $\omega_d$ is the current value of the dither signal frequency, and $\omega_n$ is the estimated system bandwidth (e.g., $\omega_n$ or $\hat{\omega}_{n,k}$).

Still referring to FIG. 7, process 700 is shown to include updating the dither frequency $\omega_d$ using the estimated system bandwidth (step 714). Step 714 may include selecting a new dither frequency $\omega_d$ using the system bandwidth $\omega_n$ or estimated system bandwidth $\hat{\omega}_{n,k}$ calculated in step 712. It may be desirable to select a dither signal frequency $\omega_d$ that is the same or similar to the system bandwidth $\omega_n$ to enhance the effect of the dither signal d on the performance variable y (e.g., by increasing the resonance between dither signal d and plant 503). For example, step 714 may include selecting a new dither frequency $\omega_d$ that is equal to the system bandwidth $\omega_n$ or a multiple of the system bandwidth $\omega_n$.

The updated dither frequency $\omega_d$ may be stored in memory and used in subsequent iterations of process 700 to generate the dither signal d. In some embodiments, the updated dither frequency $\omega_d$ is used to calculate an updated value for the system gain $K_s$ as previously described. After updating the dither frequency $\omega_d$ in step 714, process 700 may return to step 704. Steps 704-714 may be repeated iteratively to automatically update the dither frequency $\omega_d$, system gain $K_s$, and/or other ESC configuration parameters as conditions change.

Example Test Results

Figure 8:
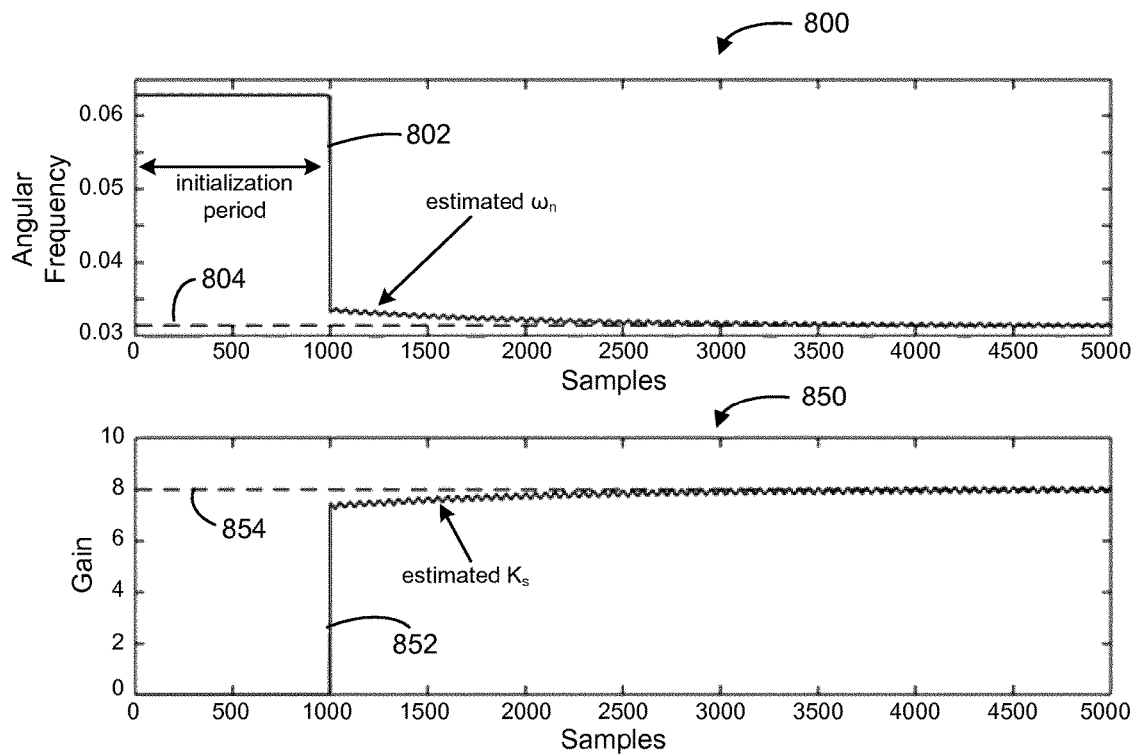
FIG. 8 is a pair of graphs illustrating two outputs of an automatic parameter estimation process (i.e., natural frequency $\omega_n$ and system gain $K_s$) which may be performed by the SCESC controller of FIG. 5, according to an exemplary embodiment.
Figure 9:
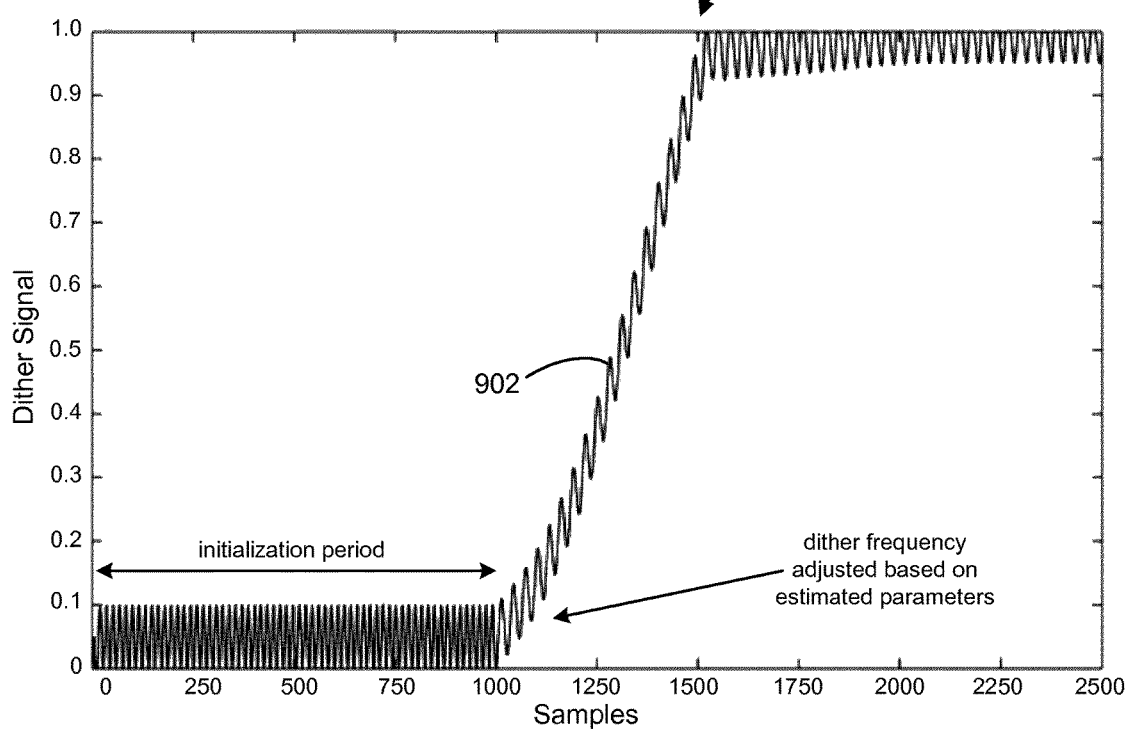
FIG. 9 is a graph of a dither signal which may be generated by the SCESC controller of FIG. 5, showing an adjustment to the dither signal frequency as a result of the automatic parameter estimation process, according to an exemplary embodiment.

Referring now to FIGS. 8-9, several graphs 800, 850, and 900 illustrating the self-configuration of extremum-seeking control parameters provided by the present invention are shown, according to an exemplary embodiment. The systems and methods of the present invention were tested using a simulated plant having the following second-order transfer function:

$$G(s) = \frac{K_s \omega_n^2}{s^2 + 2\zeta\omega_n s + \omega_n^2}$$

where $\zeta$ is the damping coefficient, $\omega_n$ is the natural frequency of the plant, and $K_s$ is the system gain. The damping coefficient $\zeta$ was set to a value of $\zeta=1$. The natural frequency $\omega_n$ was set to a value of $$\omega_n = \frac{2\pi}{200} \approx 0.031 \frac{\text{rad}}{s},$$

shown in FIG. 8 as line 804. The system gain $K_s$ was set to a value of $K_s=8$, shown in FIG. 8 as line 854.

Referring particularly to FIG. 8, the outputs of the automatic parameter estimation process (i.e., natural frequency $\omega_n$ and system gain $K_s$) are shown as a function of the number of samples of the performance variable y. Graph 800 illustrates the estimated natural frequency $\omega_n$ (i.e., the output of bandwidth estimator 524) as a function of the number of samples. The estimated natural frequency $\omega_n$ is shown as line 802. Graph 850 illustrates the estimated system gain $K_s$ (i.e., the output of gain estimator 526) as a function of the number of samples. The estimated system gain $K_s$ is shown as line 852.

As shown in FIG. 8, the estimated parameters $\omega_n$ and $K_s$ converge quickly to their actual values after an initialization period (e.g., a threshold number of cycles) has passed. For example, the estimated natural frequency $\omega_n$ converges quickly from its initial estimate of $$\omega_n \approx 0.0628 \frac{\text{rad}}{s}$$

to the actual value of $$\omega_n \approx 0.031 \frac{\text{rad}}{s}.$$

Similarly, the estimated system gain $K_s$ converges quickly from its initial estimate of $K_s=0$ to the actual value of $K_s=8$. Oscillations can be seen in the estimated parameters, but such oscillations are small relative to the estimated values.

Referring now to FIG. 9, a graph 900 illustrating the dither signal 902 (i.e., dither signal d) as a function of the number of samples is shown, according to an exemplary embodiment. The dither signal 902 may be a sinusoidal signal having a frequency of oscillation known as the dither frequency $\omega_d$, which accounts for the oscillatory characteristics of dither signal 902. As previously described, the dither frequency $\omega_d$ may be dynamically updated based on the estimated natural frequency $\omega_n$. For example, between 0 samples and 1000 samples, the dither signal 902 is shown having a relatively quick frequency of oscillation, corresponding to the initial natural frequency estimate of $$\omega_n \approx 0.0628 \frac{\text{rad}}{s}.$$

After the initialization period has passed (i.e., at approximately 1000 samples), the natural frequency estimate is updated to $$\omega_n \approx 0.031 \frac{\text{rad}}{s},$$

as shown in graph 800. In response to updating the natural frequency estimate $\omega_n$, the dither frequency $\omega_d$ is adjusted based on the new natural frequency estimate $\omega_n$. For example, the oscillatory frequency of the dither signal 902 is shown decreasing to a relatively slower frequency of oscillation at approximately 1000 samples to match the new natural frequency estimate $\omega_n$. The DC value of the dither signal 902 may also be updated using an extremum-seeking control technique in order to drive the gradient of the performance variable y to zero, as previously described. For example, the DC value of the dither signal 902 is shown increasing from an initial value of 0 to a new value of 1 at approximately 1000 samples.

Advantageously, the systems and methods of the present invention may be used to automatically identify the dither frequency $\omega_d$ and the system gain $K_s$ using the dither signal to perform system identification. This allows the present invention to be integrated within existing extremum-seeking control systems to allow such systems to be automatically configured without needing to open the loop or employ manual tests. Simulation results have demonstrated the effectiveness of the present invention to quickly and accurately identify the system bandwidth $\omega_n$ and the system gain $K_s$, which can be used to adjust the characteristics of the dither signal d and/or the control input u used to control the plant.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A self-configuring extremum-seeking control system comprising:
   a plant comprising:
      controllable HVAC equipment operable to affect a physical state or condition of the plant; and
      one or more sensors configured to measure the physical state or condition of the plant that affects a performance variable to be optimized; and an extremum-seeking controller configured to:
  perturb a first control input for the plant using a first dither signal having a first dither frequency, wherein the first control input comprises a first value for a control variable, and further wherein the control variable is different than the performance variable;
  operate the controllable HVAC equipment using the perturbed first control input;
  obtain a first output signal representative of the performance variable being optimized and derived from a first measurement of the physical state or condition of the plant during operation of the controllable HVAC equipment using the perturbed first control input, the measurement of the physical state or condition of the plant measured by the one or more sensors;
  estimate a first phase delay between the first output signal and the first dither signal;
  estimate a first bandwidth of the plant based on the estimated first phase delay;
  perturb a second control input for the plant using a second dither signal having a second dither frequency based on the estimated first bandwidth of the plant, the second control input comprising a second value for the control variable;
  operate the controllable HVAC equipment of the plant using the perturbed second control input;
  obtain a second output signal representative of the performance variable being optimized and derived from a second measurement of the physical state or condition of the plant during operation of the controllable HVAC equipment using the perturbed second control input;
  estimate a second phase delay between the second output signal and the second dither signal;
  estimate a second bandwidth of the plant based on the estimated second phase delay;
  perturb a third control input for the plant using a third dither signal having a third dither frequency based on the estimated second bandwidth of the plant, the third control input comprising a third value for the control variable; and
  operate the controllable HVAC equipment of the plant using the perturbed third control input.

2. The control system of claim 1, wherein the controller is further configured to:
  estimate a natural frequency of the plant based on the estimated first phase delay; and
  use the estimated natural frequency of the plant as the estimated first bandwidth.

3. The control system of claim 1, wherein the controller is further configured to estimate the first bandwidth of the plant as a function of the estimated first phase delay and the first dither frequency.

4. The control system of claim 1, wherein the controller is further configured to:
  calculate a dot product of the first dither signal and the first output signal;
  calculate 2-norms of the first dither signal and the first output signal; and
  estimate the first phase delay as a function of the dot product and the 2-norms.

5. The control system of claim 1, the controller further being configured to calculate a first exponentially-weighted moving average (EWMA) of the first dither signal and a second EWMA of the first output signal from the plant-to estimate the first phase delay as a function of the first and second EWMAs.

6. The control system of claim 1, the controller further being configured to:
  estimate a system gain based on the estimated first bandwidth and the first dither frequency; and
  use the estimated system gain to scale a step size of a gradient descent procedure performed by the controller.

7. The control system of claim 6, the controller further being configured to calculate a first exponentially-weighted moving average (EWMA) of the first dither signal and a second EWMA of the first output signal from the plant
  and estimate the system gain as a function of the first and second EWMAs.

8. A method for operating a plant comprising:
  perturbing a first control input for the plant using a first dither signal having a first dither frequency, wherein the first control input comprises a first value for a control variable, and further wherein the control variable is different than a performance variable to be optimized;
  operating controllable HVAC equipment of the plant using the perturbed first control input;
  obtaining a first output signal representative of the performance variable to be optimized and derived from a first measurement of the physical state or condition of the plant during operation of the controllable HVAC equipment using the perturbed first control input, the physical state or condition of the plant measured by one or more sensors configured to measure the physical state or condition of the plant that affects the performance variable;
  estimating a first phase delay between the first output signal and the first dither signal;
  estimating a first bandwidth of the plant based on the estimated first phase delay;
  perturbing a second control input for the plant using a second dither signal having a second dither frequency based on the estimated first bandwidth of the plant, the second control input comprising a second value for the control variable;
  operating the controllable HVAC equipment of the plant using the perturbed second control input;
  obtaining a second output signal representative of the performance variable being optimized and derived from a second measurement of the physical state or condition of the plant during operation of the controllable HVAC equipment using the perturbed second control input;
  estimating a second phase delay between the second output signal and the second dither signal;
  estimating a second bandwidth of the plant based on the estimated second phase delay;
  perturbing a third control input for the plant using a third dither signal having a third dither frequency based on the estimated second bandwidth of the plant, the third control input comprising a third value for the control variable; and
  operating the controllable HVAC equipment of the plant using the perturbed third control input.

9. The method of claim 8, wherein estimating the first bandwidth of the plant comprises:
  estimating a natural frequency of the plant based on the estimated first phase delay; and
  using the estimated natural frequency of the plant as the estimated first bandwidth.

10. The method of claim 8, wherein the first bandwidth of the plant is estimated as a function of the estimated first phase delay and the first dither frequency.

11. The method of claim 8, wherein estimating the first phase delay between the first output signal and the first dither signal comprises:
calculating a dot product of the first dither signal and the first output signal;
calculating 2-norms of the first dither signal and the first output signal; and
estimating the first phase delay as a function of the dot product and the 2-norms.

12. The method of claim 8, further comprising calculating a first exponentially-weighted moving average (EWMA) of the first dither signal and a second EWMA of the first output signal from the plant;
wherein the first phase delay is estimated as a function of the first and second EWMAs.

13. The method of claim 8, further comprising:
estimating a system gain based on the estimated first bandwidth and the first dither frequency; and
using the estimated system gain to scale a step size of a gradient descent procedure performed by the controller.

14. The method of claim 8, further comprising calculating a first exponentially-weighted moving average (EWMA) of the first dither signal and a second EWMA of the first output signal from the plant;
wherein the system gain is estimated as a function of the first and the second EWMAs.

15. A self-configuring extremum-seeking control system comprising:
a plant comprising controllable HVAC equipment operable to affect a physical state or condition of the plant; and
an extremum-seeking controller configured to:
perturb a first control input for the plant using a first dither signal having a first dither frequency, wherein the first control input comprises a first value for a control variable and further wherein the control variable is different than a performance variable to be optimized;
operate the controllable HVAC equipment using the perturbed first control input;
obtain a first output signal representative of the performance variable to be optimized and derived from a first measurement of the physical state or condition of the plant during operation of the controllable HVAC equipment using the perturbed first control input, the physical state or condition of the plant measured by one or more sensors configured to measure the physical state or condition of the plant that affects the performance variable;
generate a first set of one or more extremum-seeking control parameters based on the first output signal and the first dither signal;
perturb a second control input for the plant using a second dither signal having a second dither frequency based on the first set of one or more extremum-seeking control parameters, the second control input comprising a second value for the control variable;
operate the controllable HVAC equipment of the plant using the perturbed second control input;
obtain a second output signal representative of a performance variable to be optimized and derived from a second measurement of the physical state or condition of the plant during operation of the controllable HVAC equipment using the perturbed second control input;
generate a second set of one or more extremum-seeking control parameters based on the second output signal and the second dither signal;
perturb a third control input for the plant using a third dither signal having a third dither frequency based on the second set of one or more extremum-seeking control parameters, the third control input comprising a third value for the control variable; and
operate the controllable HVAC equipment of the plant using the perturbed third control input.

16. The control system of claim 15, wherein the controller is configured to generate the first set of one or more extremum-seeking control parameters by:
estimating a phase delay between the first output signal and the first dither signal;
estimating a bandwidth of the plant based on the estimated phase delay; and
using the estimated bandwidth to update the first dither frequency to generate the second dither signal.

17. The control system of claim 16, wherein the controller is further configured to estimate a system gain based on the estimated bandwidth and the first dither frequency and use the estimated system gain to scale a step of a gradient descent procedure performed by the controller.

18. The control system of claim 17, the controller further being configured to calculate a first exponentially-weighted moving average (EWMA) of the first dither signal and a second EWMA of the first output signal from the plant;
wherein at least one of the phase delay and the system gain is estimated as a function of the first and second EWMAs.

* * * * *